(12) United States Patent
Andersen et al.

(10) Patent No.: US 11,983,741 B2
(45) Date of Patent: May 14, 2024

(54) CARTOP ADVERTISEMENT VEHICLE-BASED ROUTING AND MATCHING

(71) Applicant: Uber Technologies, Inc., San Francisco, CA (US)

(72) Inventors: Peder Christopher Andersen, Lafayette, CA (US); Kalyan Pabbisetty, San Ramon, CA (US); Garrett Nicholas Spitzer, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 17/702,232

(22) Filed: Mar. 23, 2022

(65) Prior Publication Data

US 2023/0306468 A1 Sep. 28, 2023

(51) Int. Cl.
*G06Q 30/0251* (2023.01)
*G01C 21/34* (2006.01)
*H04W 4/02* (2018.01)

(52) U.S. Cl.
CPC ..... *G06Q 30/0266* (2013.01); *G01C 21/3407* (2013.01); *G06Q 30/0269* (2013.01); *H04W 4/025* (2013.01)

(58) Field of Classification Search
CPC ........... G06Q 30/0266; G06Q 30/0269; G01C 21/3407; H04W 4/025

(Continued)

(56) References Cited

U.S. PATENT DOCUMENTS

| 8,011,140 B2 | 9/2011 | Durham |
| 10,636,335 B2 | 4/2020 | Kis-Benedek Pinero et al. |

(Continued)

FOREIGN PATENT DOCUMENTS

| JP | 2022126508 A | * | 8/2022 |
| KR | 20030074022 A | | 9/2003 |
| WO | WO 0145065 | * | 6/2001 |

OTHER PUBLICATIONS

Jintao Ke, Data-driven analysis on matching probability, routing distance and detour distance in ride-pooling services, 2021 (Year: 2021).*

(Continued)

*Primary Examiner* — Tarek Elchanti
(74) *Attorney, Agent, or Firm* — Dority & Manning, P.A.

(57) ABSTRACT

Systems and methods for advertisement-based vehicle matching and routing. For example, a computer-implemented method includes obtaining data associated with a vehicle service request. The data associated with the vehicle service request is indicative of a pick-up location and a destination location associated with the vehicle service request. The method includes determining, from among a plurality of candidate vehicles, a selected vehicle for the vehicle service request based on the data indicative of the vehicle service request, candidate advertisement content items, and candidate routes for the plurality of candidate vehicles. The method includes communicating data that initiates display of a selected advertisement content item by a display device positioned on an exterior of the selected vehicle. The method includes communicating data indicative of route information to a computing device associated with the selected vehicle. The route information includes a selected route to the pick-up location.

20 Claims, 15 Drawing Sheets

(58) Field of Classification Search
USPC .................................................... 705/14.63
See application file for complete search history.

(56) References Cited

U.S. PATENT DOCUMENTS

| | | | |
|---|---|---|---|
| 10,810,628 B2 | 10/2020 | LaJoie | |
| 2001/0010028 A1* | 7/2001 | Thibault | G07C 5/085 |
| | | | 340/901 |
| 2002/0065046 A1* | 5/2002 | Mankins | G08G 1/01 |
| | | | 455/456.1 |
| 2002/0112026 A1* | 8/2002 | Fridman | G09F 21/04 |
| | | | 455/99 |
| 2002/0133293 A1* | 9/2002 | Goldman | G01S 19/36 |
| | | | 342/357.31 |
| 2003/0093199 A1* | 5/2003 | Mavreas | G07C 5/0808 |
| | | | 701/31.4 |
| 2004/0036622 A1 | 2/2004 | Dukach et al. | |
| 2005/0083403 A1 | 4/2005 | Flores et al. | |
| 2005/0154638 A1* | 7/2005 | Altaf | G06Q 30/0251 |
| | | | 705/14.49 |
| 2006/0213100 A1 | 9/2006 | McCann | |
| 2007/0072162 A1 | 3/2007 | Honadel | |
| 2011/0087524 A1* | 4/2011 | Boss | G06Q 30/02 |
| | | | 705/14.1 |
| 2011/0320275 A1* | 12/2011 | O'Sullivan | G06Q 30/0255 |
| | | | 705/14.66 |
| 2013/0024284 A1 | 1/2013 | Drozen et al. | |
| 2013/0173380 A1* | 7/2013 | Akbari | G06Q 30/0267 |
| | | | 705/14.43 |
| 2014/0081764 A1* | 3/2014 | James | G06Q 30/0265 |
| | | | 705/14.62 |
| 2014/0164125 A1* | 6/2014 | Taylor | G06Q 30/0267 |
| | | | 705/14.58 |
| 2014/0257989 A1 | 9/2014 | Prakah-Asante et al. | |
| 2015/0348112 A1* | 12/2015 | Ramanujam | G06Q 30/0266 |
| | | | 705/14.63 |
| 2016/0320198 A1 | 11/2016 | Liu et al. | |
| 2018/0033049 A1 | 2/2018 | Mayfield et al. | |
| 2018/0090039 A1 | 3/2018 | Singireddy | |
| 2018/0299883 A1 | 10/2018 | Terzian | |
| 2019/0138988 A1 | 5/2019 | High et al. | |
| 2019/0268743 A1 | 8/2019 | Cho et al. | |
| 2019/0333114 A1 | 10/2019 | Snyder | |
| 2020/0092672 A1 | 3/2020 | Nainwal et al. | |
| 2020/0160393 A1* | 5/2020 | Otsuka | G01C 21/3667 |
| 2021/0073825 A1 | 3/2021 | Walling et al. | |
| 2021/0125226 A1* | 4/2021 | Macneille | B60W 60/00253 |
| 2021/0350412 A1 | 11/2021 | Harwood et al. | |
| 2021/0357982 A1 | 11/2021 | Jay | |

OTHER PUBLICATIONS

U.S. Appl. No. 17/702,249, filed Mar. 23, 2022, 79 pages.
International Search Report and Written Opinion for Application PCT/US2023/015903, mailed Aug. 24, 2023, 15 pages.

* cited by examiner

| 140 | VEHICLE SERVICE REQUEST | |
|---|---|---|
| 220 | REQUEST IDENTIFIER | X999999 |
| 225 | PICK-UP LOCATION | POINT A |
| 230 | DESTINATION LOCATION | POINT B |
| 235 | USER PREFERENCES | X.XXX |
| 237 | SERVICE PARAMETERS | X.XXX |
| 250 | MAP DATA | X.XXX |

| 165 | VEHICLE SERVICE INSTANCE(S) | |
|---|---|---|
| 270 | USER DATA | X.XXX |
| 140 | VEHICLE SERVICE REQUEST | X.XXX |
| 275 | VEHICLE/OPERATOR DATA | X.XXX |
| 240 | OPERATOR PREFERENCES | X.XXX |
| 245 | VEHICLE CHARACTERISTICS | X.XXX |

| 277 | ROUTE INFORMATION | |
|---|---|---|
| 255 | FIRST CANDIDATE ROUTE (CR1) | X.XXX |
| 255A | PROJECTED TIME CR1 | X.XXX |
| 255B | PROJECTED TRAFFIC CR1 | X.XXX |
| 255C | PROJECTED SERVICE PRICE CR1 | X.XXX |
| 255D | PROJECTED INCENTIVES CR1 | X.XXX |
| 260 | SECOND CANDIDATE ROUTE (CR2) | X.XXX |
| 260A | PROJECTED TIME CR2 | X.XXX |
| 260B | PROJECTED TRAFFIC CR2 | X.XXX |
| 260C | PROJECTED SERVICE PRICE CR2 | X.XXX |
| 260D | PROJECTED INCENTIVES CR2 | X.XXX |
| | ... | ... |
| 265 | NTH CANDIDATE ROUTE (CRN) | X.XXX |
| 265A | PROJECTED TIME CRN | X.XXX |
| 265B | PROJECTED TRAFFIC CRN | X.XXX |
| 265C | PROJECTED SERVICE PRICE CRN | X.XXX |
| 265D | PROJECTED INCENTIVES CRN | X.XXX |

| 210 | ADVERTISEMENT CONTENT ITEM REQUEST | |
|---|---|---|
| 280 | ADVERTISEMENT CONSTRAINT(S) | X.XXX |
| 280A | RESTRICTED SUBJECT MATTER | X.XXX |
| 280B | GEOGRAPHIC CONSTRAINT | X.XXX |
| 280C | TEMPORAL CONSTRAINT | X.XXX |
| 285 | ADVERTISEMENT TARGETING | X.XXX |
| 285A | TARGETING ZONE | X.XXX |
| 285B | PREDEFINED GEOGRAPHIC RADIUS | X.XXX |
| 285C | GEOFENCE | X.XXX |
| 285D | REGIONAL CHARACTERISTICS | X.XXX |
| 285E | ATTRIBUTES OF INDIVIDUALS WITHIN A GEOGRAPHIC AREA | X.XXX |
| 285F | HISTORIC DEMAND | X.XXX |

| 215 | CENTRAL ADVERTISEMENT DATABASE(S) | |
|---|---|---|
| 290 | FIRST ADVERTISEMENT CONTENT ITEM (CI1) | X.XXX |
| 290A | CAMPAIGN IDENTIFIER CI1 | X.XXX |
| 290B | ADVERTISER IDENTIFIER CI1 | X.XXX |
| 290C | TIME CI1 | X.XXX |
| 290D | LOCATION CI1 | X.XXX |
| 290E | INDIVIDUAL IDENTIFIER CI1 | X.XXX |
| 292 | SECOND ADVERTISEMENT CONTENT ITEM (CI2) | X.XXX |
| | ... | ... |
| 295 | NTH ADVERTISEMENT CONTENT ITEM (CIN) | X.XXX |

FIG. 2

CARTOP ADVERTISEMENT VEHICLE-BASED ROUTING AND MATCHING

FIELD

The present disclosure relates generally to matching, routing, and controlling vehicles to transport users and/or items. More particularly, the present disclosure is directed to intelligently matching, routing, and controlling vehicles based on content that can be displayed by a set of distributed devices including a display device located on the exterior of a vehicle.

BACKGROUND

Vehicle services allow a user to request a service that may be performed by a vehicle, such as ride-sharing/hailing or delivery. For instance, a user may request, through a vehicle service application, a vehicle service having a source location and a destination location. A vehicle (and its driver) can be assigned to perform the vehicle service for the user. This can include transporting the rider or a delivery item to the destination location.

SUMMARY

Aspects and advantages of embodiments of the present disclosure will be set forth in part in the following description, or may be learned from the description, or may be learned through practice of the embodiments.

One aspect of the present disclosure is directed to a computing system. The computing system includes one or more processors and one or more tangible, non-transitory, computer readable media that store instructions that are executable by the one or more processors to cause the computing system to perform operations. The operations include obtaining data associated with a vehicle service request. The data associated with the vehicle service request is indicative of a pick-up location and a destination location associated with the vehicle service request. The operations include determining, from among a plurality of candidate vehicles, a selected vehicle for the vehicle service request based on the data indicative of the vehicle service request, one or more candidate advertisement content items, and one or more candidate routes for one or more of the plurality of candidate vehicles. The operations include communicating data that initiates display of a selected advertisement content item by a display device positioned on an exterior of the selected vehicle. The operations include communicating data indicative of route information to a computing device associated with the selected vehicle. The route information includes a selected route to the pick-up location.

Another example aspect of the present disclosure is directed to a computer-implemented method. The method includes obtaining data associated with a vehicle service request. The data associated with the vehicle service request is indicative of a pick-up location and a destination location associated with the vehicle service request. The method includes determining, from among a plurality of candidate vehicles, a selected vehicle for the vehicle service request based on the data indicative of the vehicle service request, one or more candidate advertisement content items, and one or more candidate routes for one or more of the plurality of candidate vehicles. The method includes communicating data that initiates display of a selected advertisement content item by a display device positioned on an exterior of the selected vehicle. The method includes communicating data indicative of route information to a computing device associated with the selected vehicle. The route information includes a selected route to the pick-up location.

Yet another example aspect of the present disclosure is directed to one or more non-transitory computer readable media storing instructions that are executable by one or more processors to perform operations. The operations can include obtaining data associated with a vehicle service request. The data associated with the vehicle service request is indicative of a pick-up location and a destination location associated with the vehicle service request. The operations include determining, from among a plurality of candidate vehicles, a selected vehicle for the vehicle service request based on the data indicative of the vehicle service request, one or more candidate advertisement content items, and one or more candidate routes for one or more of the plurality of candidate vehicles. The operations include communicating data that initiates display of a selected advertisement content item by a display device positioned on an exterior of the selected vehicle. The operations include communicating data indicative of route information to a computing device associated with the selected vehicle. The route information includes a selected route to the pick-up location.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example data structure of a memory according to example embodiments of the present disclosure;

DETAILED DESCRIPTION

Figure 1:
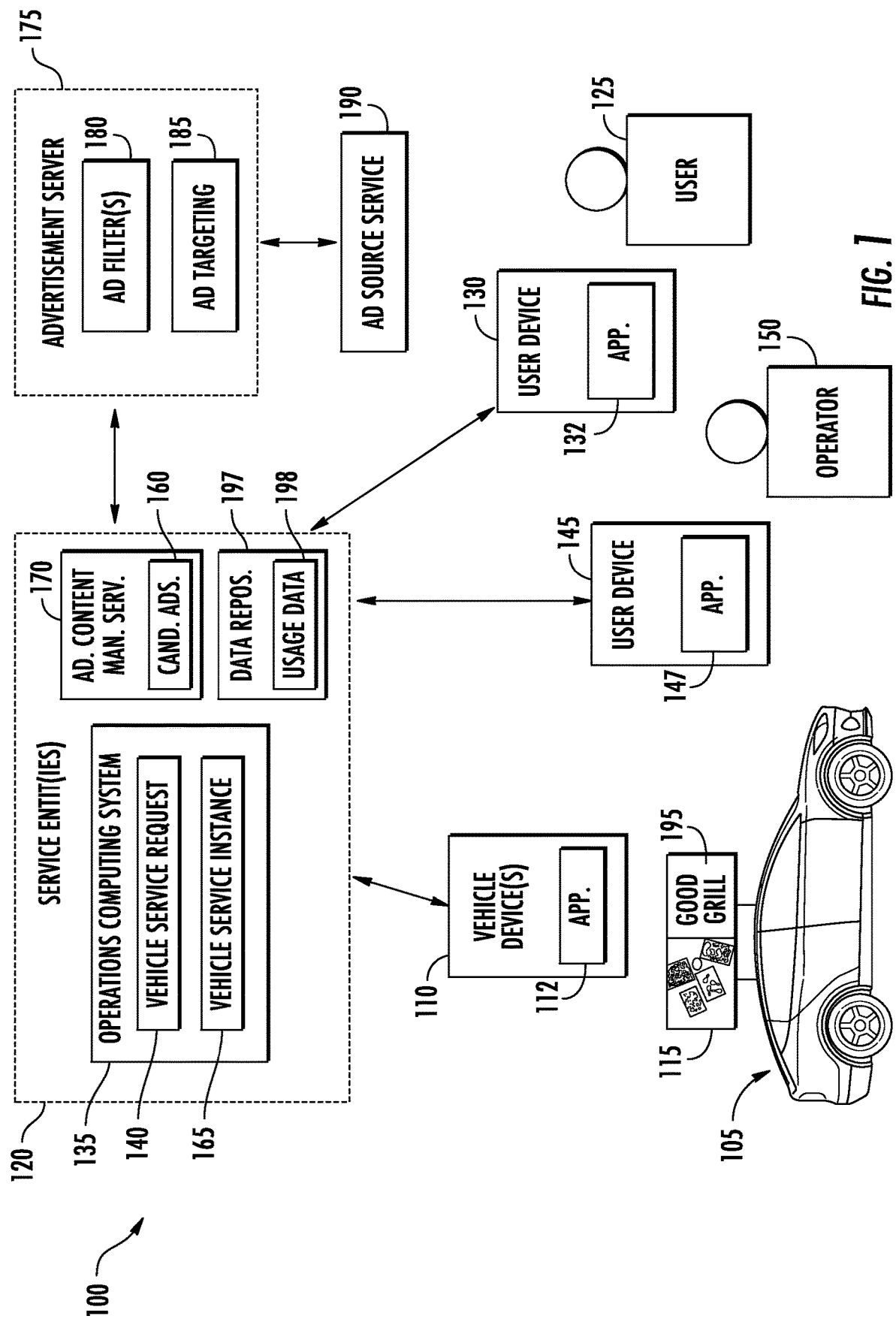
FIG. 1 depicts a block diagram of an example system for matching and routing vehicles and displaying advertisements according to example embodiments of the present disclosure.

Generally, the present disclosure is directed to improved systems and methods for advertisement-based vehicle matching and routing. More particularly, aspects of the present disclosure are directed to matching and routing vehicles to strategically display advertisements via a display device positioned on the exterior of a vehicle (e.g., a cartop display device, etc.). For instance, a service entity can be associated with a fleet of vehicles utilized to perform vehicle services (e.g., transportation, delivery, courier, etc.). The service entity can be an entity that offers and coordinates the provision of vehicle services via an operations computing system (e.g., a network system/platform, etc.). The operations computing system can obtain data associated with a vehicle service request. The vehicle service request can be provided from a user device of user and can be indicative of a pick-up location and a destination location. The operations computing system can evaluate the available fleet of vehicles to determine which vehicle should be assigned to provide the requested vehicle service.

The technology of the present disclosure can improve the ability of the operations computing system to match and route a vehicle for the vehicle service based on a certain advertisement content item. The operations computing system can analyze a plurality of candidate vehicle(s) to select a vehicle to provide the vehicle service and to display the advertisement content item. This analysis can be based on the data associated with the vehicle service request, one or more candidate advertisement content items, and one or more candidate routes.

By way of example, the operations computing system can determine that a first vehicle and a second vehicle are candidate vehicles for providing the requested service because both the first and second vehicles are within a threshold distance (and/or time) of the pick-up location. The operations computing system can determine a first candidate route for the first vehicle to the pick-up location and a second candidate route for the second vehicle to the pick-up location. The operations computing system can identify candidate advertisement content item(s) that may be displayed by the first and the second vehicles along these respective routes. The candidate advertisement content item(s) can include advertisements provided by an advertisement engine that are available for display along the route (e.g., would not violate any geographical advertisement constraints, etc.) and may be of interest to individuals in the areas (e.g., an audience) associated with the candidate route. In some implementations, the operations computing system can determine the candidate advertisement content item(s) and then determine candidate routes along which those candidate advertisement content item(s) can be displayed.

The operations computing system can determine a selected vehicle for the vehicle service based on the data indicative of the vehicle service request, the candidate advertisement content item(s), and the candidate route(s). For instance, the operations computing system can determine which of the first or second candidate vehicles can display the advertisement content item (e.g., for advertisement revenue, etc.) without exceeding a time, distance, and/or user experience threshold that would reduce the driver's and/or user's experience associated with the vehicle service. By way of example, the first candidate vehicle may have a slightly shorter estimated time of arrival (ETA) to the pick-up location. However, it may be determined that the second candidate vehicle may be able to arrive to the pick-up location within a reasonable time (e.g., within 30 s of the ETA of the first vehicle, etc.) and display an advertisement content item that would allow the cost of the vehicle service to be reduced for the user (and/or revenue to be increased for the driver, etc.). In another example, the operations computing system can determine that the second candidate route of the second candidate vehicle travels through an advertisement target area (e.g., of high advertisement value, etc.). As such, the operations computing system can determine the second candidate vehicle as the selected vehicle for the vehicle service. Additionally and/or alternatively, the operations computing system can determine the selected vehicle based on a user preference (e.g., of a certain advertisement subject, etc.), a driver preference (e.g., of a certain advertisement subject, etc.), map data, vehicle characteristic data (e.g., indicating display abilities, etc.), or an advertisement subject of the selected advertisement content item.

The operations computing system can initiate the routing of the selected vehicle that has been matched to the vehicle service based on the selected advertisement content item. For example, the operations computing system can communicate data that initiates display of a selected advertisement content item (e.g., of a certain product, event, etc.) by the display device positioned on the exterior of the selected vehicle. The operations computing system can communicate data indicative of route information to a computing device associated with the selected vehicle (e.g., a user device of the driver, etc.). The route information can include a selected route to the pick-up location that, for example, maximizes the display of the selected advertisement content item to an intended audience.

In some implementations, the selected advertisement content item can be updated based on a location of the selected vehicle. For example, the operations computing system can determine that the selected vehicle has deviated from its selected route based on the location of the selected vehicle. This can occur due to a road closure, to avoid traffic, follow a detour, maintain an ETA, etc. Based on the route deviation, the operations computing system can determine a different advertisement content item for the selected vehicle. For example, the route deviation may cause the selected vehicle to travel within a different geographic area and/or an advertisement target area such that a different advertisement content item would be preferable. Accordingly, the operations computing system can communicate data to initiate display of the different advertisement content item via the display device positioned on the exterior of the vehicle.

In some implementations, the operations computing system can provide an advertisement content item to a vehicle that is not providing a vehicle service. For example, the operations computing system can obtain data associated with the vehicle. This data can include, for example, a notification that the vehicle has completed (or will soon complete) a vehicle service for a user. Thus, the vehicle may not be associated with a vehicle service instance. While the vehicle is not performing a vehicle service, the operations computing system can provide the vehicle with an advertisement content item and route the vehicle in a specific manner within a geographic area based on the advertisement content item. For example, the vehicle can be routed to travel in certain advertisement target area(s) with an advertisement content item being displayed via the exterior display device of the vehicle. This can allow a driver of the vehicle to possibly earn additional revenue while the vehicle is not performing a vehicle service.

The technology of the present disclosure can provide a number of technical effects and benefits. For instance, aspects of the described technology can allow for more efficient vehicle matching and routing. The advertisement-based matching and routing can provide a basis by which to evaluate vehicle candidates and routes for vehicle services. This can help reduce the cost of the vehicle service to the user and/or increase the earnings of the driver. Moreover, this can improve the usage of the display device on the vehicle to ensure that its computing resources are utilized for the display of relevant content. By coordinating the type of content to be displayed and formatting instructions for doing so by a system that is remote from the display device of the vehicle, the computing hardware and software of the display device can be less robust. This can improve the weight and complexity of the display device and improve the fuel efficiency of the vehicle on which it is positioned. Moreover, the computing hardware and software of the display device can be more efficiently allocated to core functions such as, for example, improved display (e.g., resolution, sharpness, etc.) functionality and improved power allocation for these core functions.

The technology described herein includes the collection of data and provision of certain content to users associated with a vehicle service. Users can be given the opportunity to customize data collection and provision features. Data collection and provision can be configured with options for permissions to be obtained from users such that data is collected or provided for authorized use in accordance with the disclosed techniques. For example, a user can control whether certain usage data is collected and/or whether certain content is provided to the user (e.g., through opt-out features, settings, etc.). Any personal data can be removed and data can be stored in a secured, anonymized manner. In this manner, the users can be provided control over what data is collected, used, and provided to a user for the implementations described herein.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. With reference to the figures, example embodiments of the present disclosure will be discussed in further detail.

FIG. 1 depicts a block diagram of an example system 100 for routing and matching vehicles to vehicle service requests and displaying advertisements according to example embodiments of the present disclosure. As illustrated, FIG. 1 shows a system 100 that can include a vehicle 105 and one or more vehicle devices 110 that can be associated with the vehicle 105 (e.g., an onboard tablet, etc.). The vehicle device(s) 110 can include a software application 112 associated with the service entity, which can run on the vehicle device(s) 110. The vehicle 105 can include an exterior display device 115 positioned on the exterior of the vehicle 105. The exterior display device 115 positioned on the exterior device can include, for example, a cartop advertisement device. The system 100 can include one or more service entities 120 that can facilitate a request for services from a user 125. For example, the user 125 can submit a request through a user device 130 associated with the user (e.g., via a software application 132, etc.). An operations computing system 135 associated with the service entity 120 can receive a vehicle service request 140 from the user device 130. The operations computing system 135 can send a request to a user device 145 associated with an operator 150 (e.g., via a software application 147, etc.) for the operator 150 to perform the requested vehicle service. The operator 150 can be associated with the vehicle 105 (e.g., a driver of the vehicle, etc.).

The operations computing system 135 can include, communicate with, utilize, and/or otherwise be associated with an advertisement content management service 170. The advertisement content management service 170 can communicate with an advertisement server 175. The advertisement server 175 can communicate data indicative of advertisement filters 180 and advertisement targeting 185 to an advertisement source service 190. The advertisement source service 190 can provide advertisement content items 195 to the advertisement server 175. The advertisement server 175 can communicate the advertisement content item 195 to the advertisement content management service 170. The advertisement content management service 170 (and/or the operations computing system 135, etc.) can communicate data that initiates display of the advertisement content item 195 on the exterior display device 115 of the vehicle 105, as further described herein.

The vehicle device(s) 110, the exterior display device 115, the user device 130 of the user 125, and/or the user device 145 of the operator 150 can each include a respective positioning system and a communications system (not shown). A positioning system can determine a current position (e.g., location, etc.) of the respective device. The positioning system can be any device or circuitry for analyzing the position of the device. For example, the positioning system can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.), and/or other suitable techniques. The position of the device can be used by the various other systems of system 100. For example, data indicative of a device's position (e.g., location, etc.) can be stored, communicated to, and/or otherwise obtained by the operations computing system 135, the advertisement server 175, etc.

A communications system can be used for communication between/among devices and systems. For instance, the communications system of the user device 145 of the operator 150 can be configured to allow the user device 145 to communicate with other computing systems (e.g., operations computing system 135, etc.) and devices (e.g., user device 130 associated with the user 125, a user device of an entity where an item is to be retrieved, etc.). The communications system of the user device 130 of the user 125 can be configured to allow the user device 130 to communicate with other computing systems (e.g., operations computing system 135, etc.) and devices (e.g., user device 145 associated with the operator 150, etc.). The communications system of the vehicle device(s) 110 of the vehicle 105 can be configured to allow the vehicle device(s) 110 to communicate with other computing systems (e.g., operations computing system 135, etc.) and devices (e.g., user device 130 associated with the user 125, user device 145 associated with the operator 150, a user device of an entity where an item is to be retrieved, etc.). The communications system of the exterior display device 115 of the vehicle 105 can be configured to allow the exterior display device(s) 115 to communicate with other computing systems (e.g., operations computing system 135, advertisement server 175, etc.) and/or devices (e.g., user device 145 associated with the operator 150, etc.). Communication can occur over one or more networks (e.g., via one or more wireless signal connections, etc.). The network(s) can exchange (e.g., send or receive, etc.) signals (e.g., electronic signals, etc.), data (e.g., data from a computing device/system, etc.), and/or other information and include any combination of various wired (e.g., twisted pair cable, etc.) and/or wireless communication mechanisms (e.g., cellular, wireless, satellite, microwave, and radio frequency, etc.) and/or any desired network topology (or topologies). The operations computing system 135 can receive data from the positioning system(s) and the communications system(s) to facilitate matching a user 125, the vehicle service request 140, and a vehicle 105 to create a vehicle service instance 165, as further described here.

The vehicle 105 can be configured to perform vehicle services for one or a plurality of different service entities 120. It should be understood that descriptions herein discussing the performance of a vehicle service by a vehicle, includes the performance of the vehicle service by the operator associated with that vehicle (e.g., controlling the vehicle to travel in according with the vehicle service, retrieving an item, interfacing with user(s), etc.). A vehicle 105 (and an operator 150 thereof) can perform a vehicle service by, for example and as further described herein, travelling to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 120 can be associated with the provision, coordination, management, etc. of one or more vehicle services. For example, a service entity 120 can be an individual, a group of individuals, a company (e.g., a business entity, organization, etc.), a group of entities (e.g., affiliated companies, etc.), and/or another type of entity that offers and/or coordinates the provision of one or more vehicle services to one or more users. For example, a service entity can offer vehicle service(s) to users via one or more software applications (e.g., that are downloaded onto a user computing device, etc.), via a website, and/or via other types of interfaces that allow a user to request a vehicle service. As described herein, the vehicle services can include transportation services (e.g., by which a vehicle transports user(s) from one location to another, etc.), delivery services (e.g., by which a vehicle transports/delivers item(s), cargo, loads, etc. to a requested destination location, etc.), courier services (e.g., by which a vehicle retrieves item(s) from a requested origin location and transports/delivers the item to a requested destination location, etc.), and/or other types of services. The vehicle services can be wholly performed by the vehicle 105 (e.g., travelling from the user/item pick-up location to a destination location, etc.) or performed by one or more vehicles and/or modes of transportation (e.g., transferring the user/item at intermediate transfer points, etc.).

An operations computing system 135 of the service entity 120 can help to coordinate the performance of vehicle services by vehicles. The operations computing system 135 can include and/or implement one or more service platforms of the service entity 120. The operations computing system 135 can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 135 (e.g., its one or more processors, etc.) to perform operations and functions, such as those described herein for matching users and vehicles/operators, deploying vehicles, facilitating the display of advertisement content items on display devices associated with vehicles, routing vehicles, other functions for facilitating the provision of vehicle services, etc.

A user 125 can request a vehicle service from a service entity 120. For example, the user 125 can provide user input to a user device 130 to request a vehicle service (e.g., via a user interface associated with a mobile software application 132 of the service entity 120 running on the user device 135, etc.). The user device 130 can communicate data indicative of a request for a vehicle service (e.g., a "vehicle service request" 140, etc.) to the operations computing system 135 associated with the service entity 120 (and/or another associated computing system that can then communicate data to the operations computing system 130). The vehicle service request 140 can be associated with the user 125. The associated user 125 can be the one that submits the vehicle service request (e.g., via the software application 132 on the user device 135, etc.). In some implementations, the user may not be the user 125 that submits the vehicle service request 140.

The vehicle service request 140 can include data indicative of the user 125. For example, the vehicle service request can include an identifier associated with the user 125 and/or the user's profile/account with the service entity 120. The vehicle service request 140 can be generated in a manner that avoids the use of personally identifiable information and/or allows the user 125 to control the types of information included in the vehicle service request 140. The vehicle service request 140 can also be generated, communicated, stored, etc. in a secure manner to protect information.

The vehicle service request 140 can indicate various types of information. For example, the vehicle service request 140 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, to avoid a certain area, etc.). The vehicle service request 140 can indicate a type, size, and/or class of vehicle such as, for example, a sedan, an SUV, luxury vehicle, standard vehicle, truck, etc. The vehicle service request 140 can indicate a product of the service entity 120. For example, the vehicle service request 140 can indicate that the user 125 is requesting a transportation pool product by which the user 125 would potentially share the vehicle 105 (and costs) with other users/items. In some implementations, the vehicle service request 140 can explicitly request for the vehicle service to be provided by an autonomous vehicle or a human-driven vehicle. In some implementations, the vehicle service request 140 can indicate a number of users that will be riding in the vehicle and/or utilizing the vehicle service. In some implementations, the vehicle service request 140 can indicate preferences and/or special accommodations of an associated user (e.g., music preferences, climate preferences, wheelchair accessibility, etc.) and/or other information.

The operations computing system 135 of the service entity 120 can process the data indicative of the vehicle service request 140 and generate a vehicle service assignment that is associated with the vehicle service request. The vehicle service assignment can include, for example, a request for an operator 150 and/or vehicle 105 to perform the requested vehicle service. The operations computing system can identify one or more vehicles (e.g., candidate vehicles, etc.) that may be able to perform the requested vehicle service for the user 125. The operations computing system 135 can identify which modes of transportation are available to a user 125 for the requested vehicle service (e.g., human-driven vehicles, autonomous vehicles, etc.) and/or the number of transportation modes and/or legs of a potential itinerary of the user for completing the vehicle service (e.g., single or plurality of modes, single or plurality of legs, etc.). For example, the operations computing system 135 can determined which vehicle(s) are online with the service entity 120 (e.g., available for a vehicle service assignment, already addressing a vehicle service assignment, etc.) to help identify which vehicle(s) would be able to provide the vehicle service.

The operations computing system can communicate data indicative of the vehicle service assignment to an operator 150 and/or a vehicle 105. For instance, the operations computing system 135 can send a request to the user device 145 of the operator 150. The request (e.g., for the operator 150 to accept the vehicle service assignment, etc.) can be communicated to the operator 150 via the software application 147 running on the user device 145 associated with the operator 150. Additionally and/or alternatively, the operations computing system 135 can send a request to the vehicle device(s) 110 of the vehicle 105 (e.g., a tablet stored onboard the vehicle, etc.). The request (e.g., for the operator 150 to accept the vehicle service assignment etc.) can be communicated to the operator 150 via the software application 112 running on a vehicle device 110. The operator 150 can provide user input to the user device 145 (e.g., via the software application 147, etc.) and/or the vehicle device(s) 110 (e.g., via the software application 112, etc.) to accept or decline the vehicle service assignment. Data indicative of the acceptance or rejection of the request can be provided to the operations computing system 135.

The operations computing system 135 of the service entity 120 can process the data indicative of the vehicle service assignment to generate a vehicle service instance 165. The vehicle service instance 165 can include a data structure. The vehicle service instance 165 can include data associated with a user (e.g., a user identifier, etc.), a vehicle service request (e.g., a pick-up location, a destination location, etc.), and a vehicle (e.g., the selected vehicle to provide the vehicle service, etc.).

The operations computing system 135 can maintain, store, etc. data associated with vehicle services over time in a data repository 197. This can include, for example, data associated with the user 125 and/or one or more other users. As described herein, the user can be presented with options for controlling the types, frequency, etc. of data collected. The data associated with the user can include historical vehicle service usage data 198 of the user and/or one or more other users. The historical vehicle service usage data 198 can include, for example, data indicative of the past locations associated with past vehicle service request(s)/instance(s) of the user and/or other users (e.g., past pick-up locations, past drop-off locations, past entities from which the user has ordered items, etc.). In some implementations, the historical vehicle service usage data can include preferences and/or characteristics associated with past vehicle service request(s)/instance(s). This can include, for example, types of items (e.g., food, etc.) ordered for delivery, types of locations visited (e.g., restaurant, entertainment, work, home, etc.), and/or other information. In some implementations, the historical vehicle service usage data can include data indicative of timing associated with past vehicle services (e.g., when food delivery was requested, etc.). The historic vehicle service usage data can include and/or be utilized as demand data. For example, as described herein, the historical vehicle service usage data 198 can be used to determine advertisement content items for a user 125.

The vehicle 105 can include an exterior display device 115. The exterior display device 115 can receive data from one or more other systems/devices of system 100. For example, the exterior display device 115 can obtain data from the operations computing system 135, the advertisement server 175, and/or another device (e.g., the vehicle device(s) 110, user devices 130/145, etc.). The data received can initiate display of a content item (e.g., advertisement content item 195, etc.) on the external display device 115. For example, the external display device 115 can be any type of display device (e.g., a cartop advertisement display device, liquid crystal display (LCD), liquid emitting diode display (LED), organic light emitting diode (OLED), plasma monitor, cathode ray tube (CRT), or any other display device, device located on any external surface of a vehicle, etc.). The exterior display device 115 can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 142 (e.g., its one or more processors, etc.) to perform operations and functions, such as those described herein for presenting/rendering content via a physical display and/or providing content via other output device(s). By way of example, the exterior display device 115 can obtain data indicative of an advertisement content item 195 and process the data to present a visualize of the advertisement content item 195 via/through a screen of the exterior display device 115.

In some implementations, an advertisement content item 195 can be selected, for example, using an advertisement content management service 170 and/or an advertisement server 175. The operations computing system 135 can include, communicate with, etc. the advertisement content management service 170. The advertisement content management service 170 can help with the selection of, provision of, and/or coordinating display of candidate advertisement content item(s) 160 for the service entity 140 (e.g., for vehicle services), as further described herein. For example, the advertisement management service 170 can coordinate with the advertisement server 175 and/or the exterior display device 115 to facilitate the display of an advertisement content item 195.

In some implementations, the advertisement content management service 170 can include an advertisement server such as the advertisement server 175. The advertisement server 175 (and/or its source service) can be associated with the service entity providing the vehicle service and included in its computing systems. The advertisement server 175 (and/or its source service) can be associated with a third-party that is not associated with the service entity providing the vehicle service.

The advertisement content management service 170 can communicate with an advertisement server 175 via one or more networks. The advertisement server 175 can control generation and/or provision of advertisements to the advertisement content management service 170 and, ultimately, to the exterior display device 115, user device 130, and/or other endpoint(s). For instance, the advertisement content management service 170 can communicate a request for an advertisement content item to the advertisement server 175. Candidate advertisement content item(s) 160 may be filtered by using advertisement filter(s) 180 (e.g., of an advertisement filtering service, etc.). Additionally and/or alternatively, the candidate advertisement content item(s) 160 may be targeted using advertisement targeting 185 (e.g., of an advertisement targeting service, etc.).

For example, the advertisement server 175 can include data indicative of one or more advertisement filters 180 and advertisement targeting 185. The data indicative of the one or more advertisement filters 180 can be associated an advertisement filtering service. The advertisement server 175 (e.g., via the advertisement filtering service, etc.) can filter candidate advertisement content items 160 based on an advertisement type. For instance, the advertisement filtering service can accept an advertisement type or advertisement category and a location (e.g., coordinates, etc.) and determine whether the advertisement type or advertisement category should be displayed at the location (e.g., as a Boolean value, etc.). The data indicative of the advertisement targeting 185 can be associated with an advertisement targeting service. The advertisement targeting service can restrict irrelevant candidate advertisement content items 160 from being provided to the advertisement management service 170. As one example, advertisers may be provided with the capability of targeting their advertisements based on one or more points of interest. The advertisement targeting service can represent the points of interest as a geofence, advertisement target area, etc. The advertisement targeting service (e.g., using the advertisement targeting 185, etc.) can decide whether to show a specific advertisement based on the geofence.

The advertisement server 175 can also communicate with an advertisement source service 190. The advertisement source service 190 can be a repository of advertisement content items, such as a central advertisement database. As one example, advertisers may define, create, upload, or otherwise provide advertisement content items to advertisement source service 190. For instance, an advertisement content item may have an associated campaign identifier, advertiser identifier, time, location, individual identifier, etc. The campaign identifier may uniquely identify an advertisement campaign (e.g., a campaign for a particular promotion, event, time period, etc.). The advertisement content item may also have associated spatial and/or temporal endpoints. For instance, the advertisement content item and/or associated metadata may define coordinates or other geographic markers for the start and/or end of advertisement display, time stamps, etc.

The advertisement server 175 can retrieve one or more advertisements from the advertisement source service 190 in response to a request for an advertisement content item. For instance, the advertisement server 175 can submit a request to the advertisement source service 190 for an advertisement content item. The request can include information associated with the advertisement filters 180 and the advertisement targeting 185. In response to obtaining data from the advertisement server 175, the advertisement source service 190 can provide data indicative of candidate advertisement content items 160 and/or a selected advertisement content item (e.g., advertisement content item 195, etc.). The data indicative of the candidate advertisement content items 160 (and/or selected advertisement content item) can be communicated to the advertisement content management service 170.

Data indicative of an advertisement content item can be communicated from any one or more of the advertisement content management service 170, the operations computing system 135, the advertisement server 175, the advertisement source service 190, and/or another system. For example, such data can be communicated to the exterior display device 115 directly by one of these system(s) or indirectly by one of these systems(s) (e.g., through an intermediary system, etc.). Communicating the data indicative of the advertisement content item (e.g., advertisement content item 195, etc.) can initiate display of the advertisement content item 195 on the exterior display device 115 associated with the vehicle 105, as described herein.

The systems of FIG. 1 can obtain and/or use data for routing and matching vehicles based on vehicle service requests and/or displaying advertisements according to example embodiments of the present disclosure. For example, the systems can use the data described with reference to FIG. 2, which illustrates data structures and the type of information, meta-data, etc. included therein. For example, an operations computing system 135 can determine candidate/selected vehicle(s), candidate/selected advertisement content item(s), and/or candidate/selected route(s) based on any of data described in FIG. 2.

FIG. 2 illustrates the type of information/data that can be included in, for example, the vehicle service request 140, one or more vehicle service instances 165, route information 277, one or more advertisement content item requests 210, and/or one or more central advertisement databases 215. The types of included information/data and/or data structures shown in FIG. 2 are presented for example explanation purposes only and are not meant to be limiting. Other types of information/data and/or data structures can be utilized by the systems described herein.

FIG. 2 depicts an example vehicle service request 140. As described herein, the service entity 120 can receive a vehicle service request 140 for a vehicle service. For instance, the vehicle service request 140 can be data that includes a user transportation service request for one or more users. In addition, or alternatively, the vehicle service request 140 can include a product transportation service request for one or more items (e.g., items/products for personal delivery, bulk items for business, freight transportation, baggage, other payloads, etc.). In this regard, the vehicle service request 140 can include data indicative of a request for various types of vehicle services for various purposes (e.g., transportation, observation, supply positioning, etc.).

The vehicle service request 140 can include various data associated with the user 125, a vehicle service, and/or the service entity 120. For example, the vehicle service request 140 can include a request identifier 220, a pick-up location 225, a destination location 230, user preferences 235, service parameters 237 (e.g., indicating a type of service, a level of service, etc.), map data 250 (e.g., indicating a current location of a user, coordinates/address of the pick-up of drop-off locations, etc.), and/or other data. By way of example, the vehicle service request 140 can include a request identifier 220 indicative of vehicle service request 140, the timing of vehicle service request 140, etc. In addition, the vehicle service request can include a pick-up location 225 and a destination location 230 indicative of a geographic location. The geographic location can include, for example, one or more geographic coordinates, reference landmarks, global positioning data, an address, semantic location, etc. For example, the vehicle service request 140 can be associated with a transportation service for a user 125 from the pick-up location 225 (e.g., start location, a requested origin, etc.) to a destination location 230 (e.g., end location, a requested destination, etc.). By way of example, the pick-up location 225 can include the location (e.g., current location, anticipated location, etc.) of the user 125 and the end location can include a desired, future location of the user 125.

In some implementations, the vehicle service request 140 can include one or more user preferences 235. The one or more user preferences 235, for example, can include type of advertisement content item displayed, pick-up preferences (e.g., indicating a side of the street, etc.), drop-off preferences (e.g., indicating food item left at door, user contacted, etc.), a price range, a time/time restrictions, music preferences, climate preferences, etc. By way of example, the user 125 associated with the vehicle service request 140 can specify one or more user preferences 235 for the vehicle service. In addition, or alternatively, the user 125 can be associated with a user profile indicative of one or more user preferences 235. For example, in some implementations, a user 125 of service entity 120 can create a user profile for the service entity (e.g., through an application 132 on a user device, etc.). The user profile can indicate one or more user preferences 235 for future service requests from the user.

The vehicle service request 140 can include one or more service parameters 237. The service parameters 237 can indicate, for example, a type of service (e.g., user transport, delivery, courier, etc.), a number of riders, accommodations (e.g., child car seat, wheelchair accessibility, etc.), a vehicle type/class, a level of service (e.g., base product, luxury product, etc.) and/or other parameters associated with the vehicle service.

In some embodiments, the operations computing system 135 can determine map data 250 associated with a vehicle service request 140. For example, map data 250 can include data indicative of roads, tolls, speed limits, traffic signs, buildings, stores, postal codes, geographic areas, traffic, construction, road closures, etc. associated with the geographic region associated with the vehicle service request 140.

The operations computing system 135 can match a vehicle 105 to a vehicle service request 140. For example, the operations computing system 135 can communicate a vehicle service assignment to one or more candidate operators (e.g., via their user devices, etc.) to request that at least one operator accept performance of the vehicle service request 140.

In some embodiments, once a vehicle (e.g., vehicle 105, etc.) is matched with a vehicle service request 140, a vehicle service instance 165 data structure can be stored. The service entity 120 can create a vehicle service instance 165 in response to matching a user 125, vehicle service request 140, and an operator 150/vehicle 105. For example, the vehicle service instance 165 can include user data 270 (e.g., indicating a user identifier, user's profile, user's rating, etc.), at least a portion of the data of the vehicle service request 140, and/or vehicle/operator data 275 (e.g., indicating the vehicle/operator, vehicle/operator's profile, vehicle/operator's rating, etc.). The data indicative of vehicle service request 140 can include any data in vehicle service request 140.

In some implementations, the vehicle service instance 165 can include one or more operator preferences 240. For example, the operator preferences 240 can include operator preferences, preferred advertisement content item display subject matter, etc. In addition, or alternatively, the vehicle service instance 165 can include one or more vehicle characteristics 245. Vehicle characteristics 245 can include vehicle type, size, class, and/or vehicle capabilities such as, for example, a sedan, an SUV, luxury vehicle, standard vehicle, truck, seat capacity, storage capacity, load capacity, display capabilities, associated user devices, and/or accessibility features, etc.

The operations computing system 135 can determine route information 277 for a vehicle 105 that is associated with the vehicle service instance. The operations computing system 135 can include one or more candidate routes 255/260/265 and one or more projected route features 255A-255D/260A-260D/265A-265D. For example, the operations computing system can determine first candidate route 255, second candidate route 260, Nth candidate route 265, etc. The operations computing system 135 can determine projected route features for each candidate route (e.g., first candidate route 255, second candidate route 260, Nth candidate route 265, etc.). For example, candidate route features can include a projected time 255A/260A/265A, a projected traffic level 255B/260B/265B, a projected service price 255C/260C/265C, and/or projected incentives 255D/260D/265D for each respective candidate route 255/260/265 for the vehicle service. The operations computing system 135 can determine the projected route features based on a number of factors. For example, the operations computing system 135 can analyze historical data to determine the one or more projected route feature. For instance, the operations computing system 135 can determine the one or more projected route features based on a plurality of previous service requests. By way of example, the operations computing system 135 can receive a plurality of previous service requests with one or more similar attributes (e.g., similar pick-up location, destination location, time of day, etc.) to the vehicle service request 140. The operations computing system 135 can analyze the results of the plurality of previous similar service requests to determine the one or more projected route features for the vehicle service request 140.

In addition, the operations computing system 135 can determine one or more candidate routes 255/260/265 for the vehicle service request 140. For example, and as described in further detail below, the operations computing system 135 can determine the candidate vehicle routes 255/260/265 from the pick-up location 225 of the vehicle service request 140 to the destination location 230 of the vehicle service request 140. The candidate routes 255/260/265 for example, can include one or more directions from the pick-up location 225 to the destination location 230.

The advertisement server 175 can receive an advertisement content item request 210 from the advertisement content management service 170. The advertisement content item request 210 may include data indicative of advertisement constraint(s) 280 and advertisement targeting 285, as discussed herein. Data indicative of advertisement constraint(s) 280 can include restricted subject matter 280A, geographic constraints 280B, and/or temporal constraints 280C, etc. Geographic constraints 280B and restricted subject matter 280A can include limitations based on school zones, religious zones, legal restrictions, social policy concerns, etc. Temporal constraints 280C can be based on time (e.g., time of day, seasonal, event based, etc.). Data indicative of advertising constraints 280 can be obtained from first-party data (e.g., acquired by service entity 120, etc.), third-party data (e.g., acquired by a third-party not associated with service entity 120, etc.), data associated with predefined geographic areas, data acquired via user input (e.g., from operators and/or users, etc.), integration with event application programming interfaces (e.g., event APIs, event source data, etc.).

Advertisement targeting data can include targeting zones 285A, predefined geographic radii 285B, geofences 285C, regional characteristics 285D, attributes of individuals within a geographic area 285E and/or historic demand 285F. Targeting zones 285A can include, for example, advertisement target areas. Targeting zones may be based in part on data indicative of geographic radii 285B and geofences 285C. Regional characteristics 285D can include data associated with characteristics of a population within a geographic area (e.g., age, purchase history, popular locations, etc.). Historic demand data can include data indicative of success of previous advertisement content item conversions (e.g., foot traffic to a physical store location, a user downloading an application, a user purchasing an item, a user signing up for a subscription, a user signing up for a mailing list, a user creating a user profile, optimal advertisement placement to drive foot traffic to a particular physical store location, etc.) and previous usage data (e.g., historical vehicle service usage data 198, etc.).

The advertisement server 175 can use the data related to the advertisement content request 210 to communicate (e.g., with the advertisement source service 190, etc.) one or more candidate advertisement items (e.g., candidate advertisement content items 160, etc.). Candidate advertisement items 160 can be filtered (e.g., by one or more advertisement filters 180, etc.) and targeted (e.g., by an advertisement targeting service, etc.).

In some embodiments, candidate advertisement content items 160 can be obtained from one or more central advertisement databases 215. For example, central advertisement database(s) 215 can be associated with an advertisement source service. Central advertisement database(s) 215 can include data indicative of one or more advertisement content items. In some instances, the one or more advertisement content items can be a first advertisement item 290. First advertisement content item 290 can have associated features 290A-290E. The associated features 290A-290E of first advertisement content item 290 can include a campaign identifier 290A, an advertiser identifier 290B, a time 290C, a location 290D, and/or an individual identifier 290E, etc. For example, there can be more than one advertisement content items. There can include a plurality of advertisement content items (e.g., second advertisement content item 292 and/or Nth advertisement content item 295, etc.). Each advertisement content item (e.g., second advertisement content item 292 and/or Nth advertisement content item 295, etc.) can have associated features (not shown) similar to the features 290A-290E of first advertisement content item 290. A content item can be selected for display on an external display device (e.g., external display device 115 positioned on the exterior of vehicle 105, etc.) can be retrieved from a central advertisement database 215.

Figure 3:
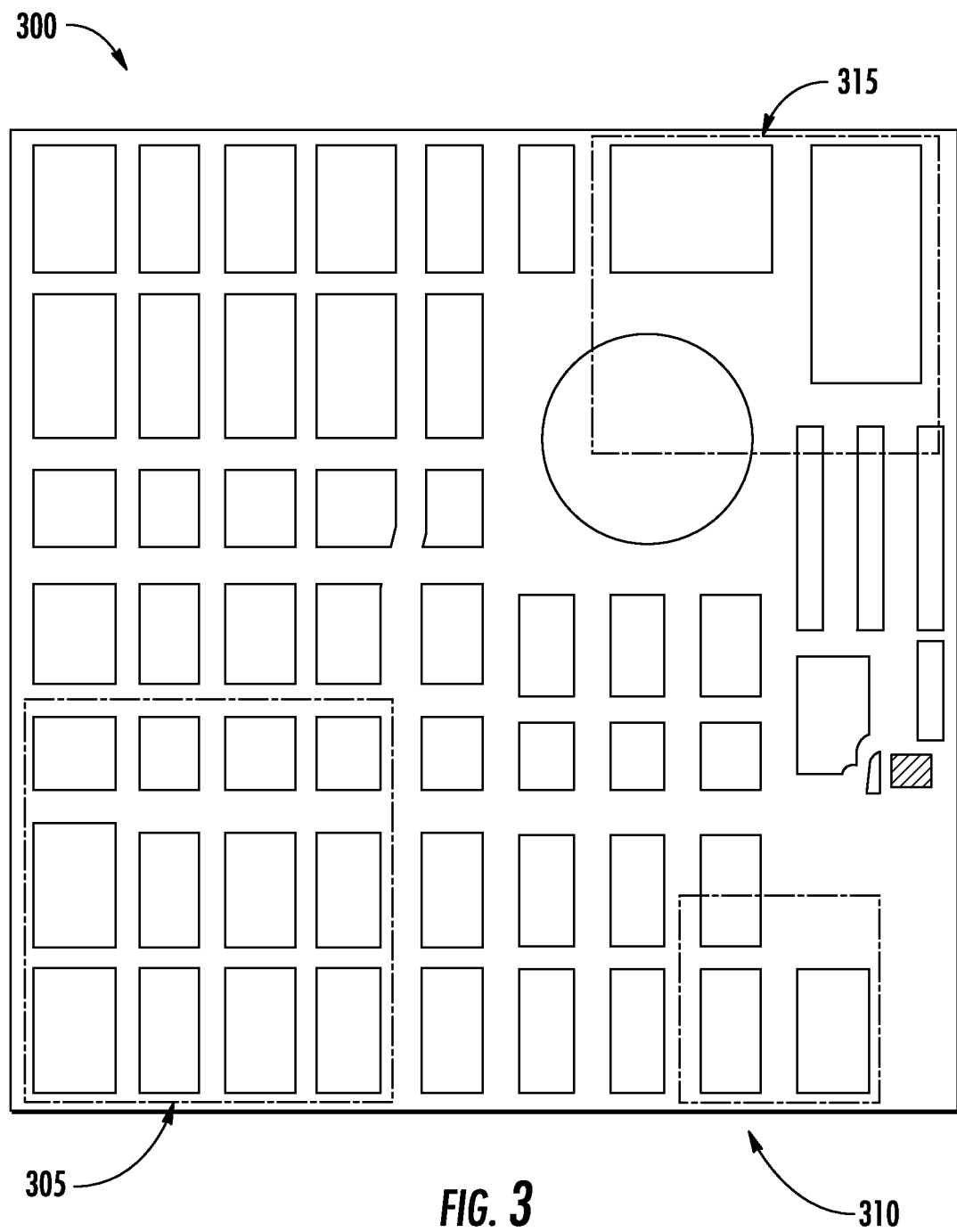
FIG. 3 depicts an example geographic area according to example embodiments of the present disclosure.

The data described herein can be used by the systems of computing system 100 to determine improved advertisement display and vehicle routing. By way of illustration, FIG. 3 depicts an example geographic area 300 associated with a vehicle service request 140. The geographic area 300 can include one or more advertisement targeting areas and advertisement constraint areas. The one or more advertisement targeting areas, for example, can include a first advertisement target area 305 and/or a second advertisement target area 310, etc. First advertisement target area 305 can, for example, be a geographic area associated with data indicative advertisement targeting 285. This can include, for example, data indicative of favorable regional characteristics 285D, favorable attributes of individuals within a geographic area 285E (e.g., an audience), favorable historic demand 285F, etc. By way of example, people of this area can be associated with demand data that indicates that a particular restaurant or product from a restaurant is frequently ordered by these residents. Such data can be collected by a service entity via a food delivery service application.

One or more advertisement constraint areas can include advertisement constraint area 315. Advertisement constraint area 315 can be associated with one or more advertisement constraint 280 that prevent a particular candidate advertisement content item from being displayed within the advertisement constraint area 315 (e.g., a school zone that prohibits display of alcohol advertisements, etc.). Data indicative of the advertisement constraint area 315 can be stored by the operations computing system 135 or obtained via another computing system (e.g., an advertisement server, system associated with a regulatory entity, etc.).

The operations computing system 135 can determine candidate vehicle routes based on at least one advertisement target area or advertisement constraint area. For example, operations computing system 135 can obtain data indicative of first advertisement target area 305, second advertisement target area 310, and advertisement constraint area 315 from the advertisement server 175. The operations computing system 135 can determine a candidate route for a vehicle 105 to perform a vehicle service request 140 based on one or more advertisement target areas (e.g., first advertisement target area 305 and/or second advertisement target area 310, etc.) and one or more advertisement constraint areas (e.g., advertisement constraint area 315, etc.). The candidate route can include a vehicle travelling within at least one of the first advertisement target area 305 or second advertisement target area 310 (e.g., for potentially displaying advertisement content that may be of particular relevance to the target area, etc.) or avoiding the advertisement constraint area 315 (e.g., to avoid displaying content not permitted in the area, etc.).

In some embodiments, advertisement target areas may have a variety of different characteristics. For example, one or more of the characteristics can be static (e.g., the quantity of residential housing and commercial buildings may indicate a more densely populated area, etc.). Additionally and/or alternatively, the characteristics can be dynamic (e.g., temporary increase in individuals located in the area of an event (e.g., concert, sporting event, plane landing, school letting out, etc.)). For example, first advertisement target area 305 can be temporarily more densely populated than a second advertisement target area 310, or vice versa, due to an event. The more densely populated area may be a higher value advertisement target area for displaying advertisement content via an exterior display device of a vehicle.

The operations computing system 135 determine candidate route(s) based on the advertisement target area(s) and/or constraint areas. The candidate route(s) can help inform the selection of advertisement content to be displayed via the display device positioned on the exterior of the vehicle. Additionally, or alternatively, certain advertisement content item(s) can be identified first and then used to generate/select candidate routes.

Figure 4:
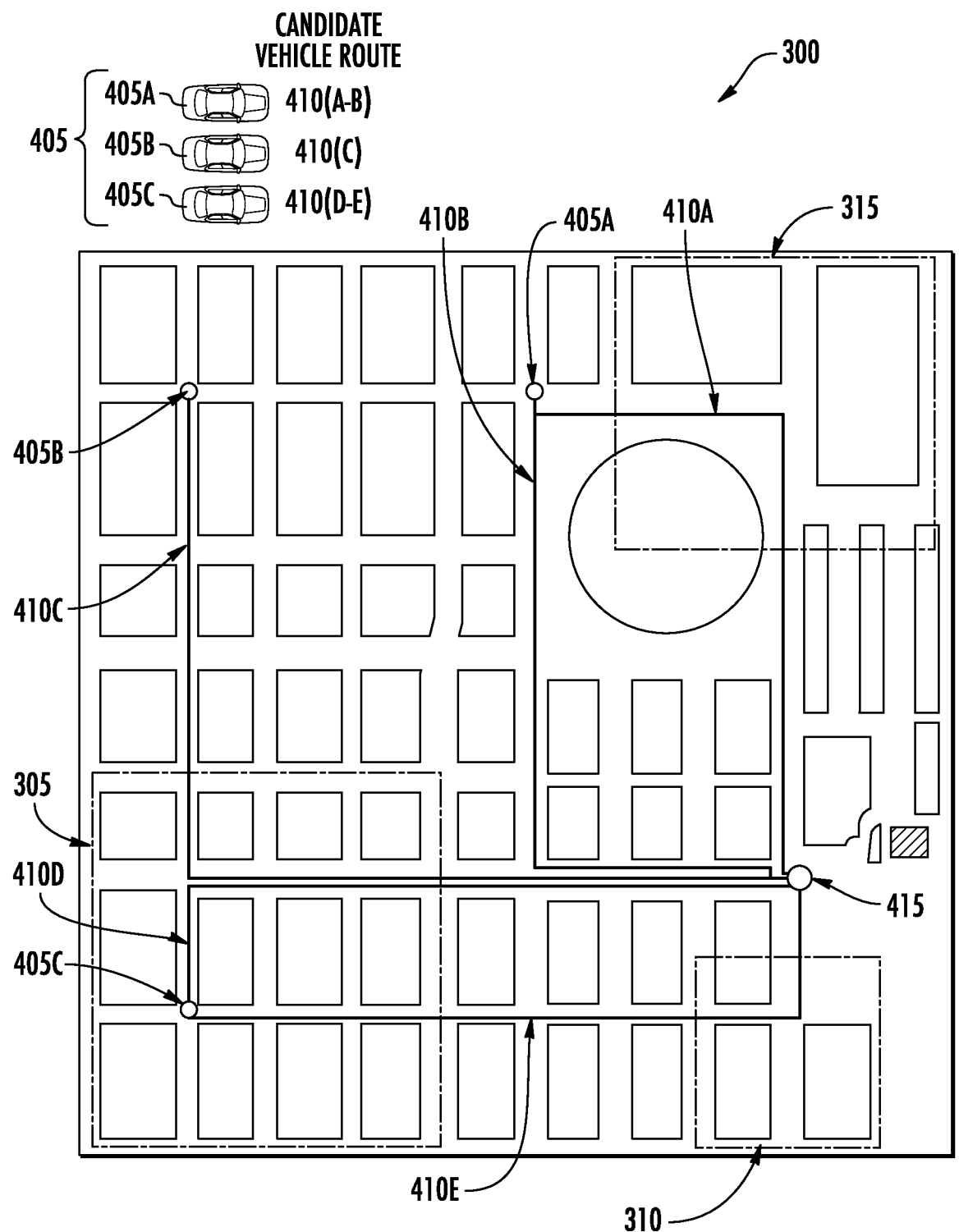
FIG. 4 depicts an example geographic area according to example embodiments of the present disclosure.

For example, FIG. 4 depicts several candidate vehicles and associated candidate routes for a plurality of vehicles for the example geographic area 300. The candidate vehicles and routes in FIG. 4 are presented for example explanation purposes only and are not meant to be limiting. Other candidate vehicles and routes can be utilized by the systems described in the present disclosure.

The operations computing system 135 can determine candidate vehicles 405 for performing a vehicle service request 140. Candidate vehicles 405 can include first candidate vehicle 405A, second candidate vehicle 405B, and/or third candidate vehicle 405C. The operations computing system 135 can obtain data associated with a vehicle service request. The operations computing system 135 can determine a pick-up location 415 based on the vehicle service request 140 (e.g., as specified by a user, etc.). Each candidate vehicle of the candidate vehicles 405 can have one or more associated candidate vehicle route(s) 410A-E between the origin location of candidate vehicle 405A-C and the pick-up location 415 associated with the vehicle service request 140 from the user 125.

In some implementations, candidate vehicle 405A can have two candidate vehicle routes 410A-B between the origin location of candidate vehicle 405A and pick-up location 415. For example, a first candidate vehicle route 410A can require first candidate vehicle 405A to travel through advertisement constraint area 315 (e.g., violate advertisement constraint area 315, etc.). In addition, or alternatively, candidate vehicle 405A can have a second candidate vehicle route 410B that can avoid advertisement constraint area 315. Second candidate vehicle 405B can have a single candidate vehicle route 410C between the current location of 405B and the pick-up location 415. Third candidate vehicle 405C can have two candidate vehicle routes 410D-E between the current location of candidate vehicle 405C and the pick-up location 415. For example, a first candidate vehicle route 410D can include candidate vehicle 405 travelling through first advertisement target area 305. A second candidate vehicle route 410E can include third candidate vehicle 405C to travelling through both first advertisement target area 305 and second advertisement target area 310.

In some implementations, the operations computing system 135 can obtain and/or use data for routing and matching vehicles (e.g., candidate vehicles 405, etc.) to vehicle service requests (e.g., vehicle service request 140, etc.), and/or displaying advertisements (e.g., advertisement content item 195, etc.) according to example embodiments of the present disclosure. For example, the operations computing system 135 can determine from a plurality of candidate vehicles, a selected vehicle for the vehicle service based on the data indicative of the vehicle service request, one or more candidate advertisement content items, and/or one or more candidate routes for one or more of the plurality of candidate vehicles. For example, the operations computing system 135 can evaluate a plurality of candidate advertisement content items based on the candidate routes 410A-E of candidate vehicles 405A-C. The operations computing system 135 can analyze the candidate advertisement content items to determine what candidate advertisement item can be displayed on each candidate route 410A-E to generate one or more vehicle-route-ad sets, with each respective vehicle-route-ad set including a candidate route/vehicle(s) and a candidate advertisement content item.

The operations computing system 135 can determine a selected vehicle, a selected advertisement content item, and a selected vehicle route based on the one or more vehicle-route-ad sets. For instance, the operations computing system 135 can determine which vehicle-route-ad set would result in the highest level of value (e.g., advertisement revenue that can be applied to reduce the cost of the vehicle service to the user and/or increase the fee paid to the operator 150, etc.).

For example, the value (V) can be expressed as $V = w_1 |\Delta C_u| + w_2 |\Delta F_o|$, where $\Delta C_u$ is the cost difference to the user (e.g., the reduction in cost resulting from ad revenue through displaying advertisement content), $\Delta F_o$ is the fee difference to the operator (e.g., the increase in fee resulting from ad revenue through displaying advertisement content), and where $w_1$ and $w_2$ are weighting factors that can be applied to the respective elements. This analysis can take into account the respective candidate vehicle 405A-C travelling along candidate routes 410A-E into advertisement target area(s) 305 (e.g., which can increase value, etc.) as well as avoiding (and/or having to traverse) advertisement constraint area(s) 315 (e.g., which can decrease value, etc.). The operations computing system 135 can rank each vehicle-route-ad set relative to one another based on value and the select the highest ranked vehicle-route-ad set. The operations computing system 135 can determine the candidate vehicle, candidate route, and candidate advertisement content item of the highest ranked vehicle-route-ad set as the selected vehicle, selected route, and the selected advertisement content item. The operations computing system 135 can communicate data that initiates display of a selected advertisement content item by the display device positioned on an exterior of the selected vehicle and data indicative of route information to a computing device associated with the selected vehicle. The route information can include, for example, a selected route to the pick-up location.

In some implementations, the operations computing system 135 can determine a candidate or selected advertisement content item and, from there, determine the candidate vehicles and candidate routes. For example, the operations computing system 135 can determine one or more candidate advertisement content items that can be displayed via the display device positioned on the exterior of the vehicle. In some implementations, the operations computing system 135 may even determine the selected advertisement content item (e.g., because it is next in queue, etc.). The operations computing system 135 can determine candidate vehicles 405A-C and candidate routes 410A-E along which the candidate/selected advertisement content item(s) can be displayed (e.g., avoiding constraint areas, etc.). The operations computing system 135 can generate one or more vehicle-route-ad sets for each combination of candidate advertisement content item, vehicle, and route. Additionally, or alternatively, the operations computing system 135 can generate one or more vehicle-route-ad sets for a selected candidate advertisement content item across various candidate vehicle/route combinations. As similarly described herein, the operations computing system 135 can analyze the vehicle-route-ad sets and determine the selected vehicle, selected route, and the selected advertisement content item accordingly. The operations computing system 135 can communicate data that initiates display of a selected advertisement content item by the display device positioned on an exterior of the selected vehicle and data indicative of route information to a computing device associated with the selected vehicle. The route information can include, for example, a selected route to the pick-up location.

The operations computing system 135 can determine, from among the one or more candidate routes, a selected route based on (i) a distance threshold; (ii) a time threshold; or (iii) a user experience measure. A distance threshold can be a maximum allotted distance difference between one or more candidate routes to travel from a first location (e.g., an origin location, a pick-up location, etc.) to a second location (e.g., a pick-up location, a destination location, etc.). For example, a distance threshold can be a predetermined number of miles, kilometers, and/or any other physical measurement. In addition, or alternatively, a threshold distance can vary based on the relevant distance from the first location to the second location (e.g., based on a proportion of total distance expected to be traveled, based on a formula, etc.). A time threshold can be a maximum allowed time difference (e.g., difference in ETA, etc.) between one or more candidate routes to travel from a first location (e.g., an origin location, a pick-up location, etc.) to a second location (e.g., a pick-up location, a destination location, etc.). For example, a time threshold can be a predetermined number of seconds, minutes, etc. Additionally and/or alternatively, a threshold time can vary based on the relevant distance from the first location to the second location (e.g., based on a proportion of a total time expected to be traveled, based on a formula, etc.). A user experience measure can be any measure associated with a user's expectation for the associated vehicle service (e.g., experience by a passenger, food delivery requester, courier service requester, vehicle operator, etc.). For example, a user experience measure can include a vehicle operator's or passenger's tolerance for travelling through a specific geographic area and/or a user's service level, etc. The user experience measure can be calculated based on the additional amount of time it would take a vehicle to a location relative to another route that avoids a target area or traverses a constraint area. In some implementations, the user experience measure can take into account an offset value indicating other actions that can be taken to maintain a favorable user experience. For example, the offset can include a discount for allowing a longer wait time, decreased cost for a user, an incentive for the operator accepting a vehicle service request, increased revenue for an operator, etc.

The distance, a time, and/or user experience measure can be utilized to select candidate vehicle routes. By way of example, operations computing system 135 can determine one or more candidate routes by obtaining data associated with a first location (e.g., a current location of a candidate vehicle 405, etc.). The operations computing system 135 can determine a difference between candidate vehicle routes (e.g., candidate vehicle route 410A and candidate vehicle route 410B, etc.). This can include a difference in (i) distance traveled between the two locations, (ii) a difference in time, or (iii) a difference in user experience measure. Data indicative of a threshold difference can be determined and/or obtained by the operations computing system 135. A difference in two candidate routes can be compared to the threshold difference. A difference in two candidate routes can be above a threshold difference. In response, the more favorable candidate route can be chosen. For example, candidate route 410A can have a 5 minute ETA for candidate vehicle 405A to arrive at pick-up location 415 and candidate vehicle route 410B can have a 5 minutes and 45 seconds ETA for candidate vehicle 405A to arrive at pick-up location. The difference in ETA between the two candidate vehicle routes can be 45 seconds. In some examples, the threshold difference in time (e.g., ETA, etc.) can be 30 seconds. The operations computing system 135 can determine that the difference between the two candidate vehicle routes of 45 seconds is above the threshold difference of 30 seconds. The operations computing system 135 can select candidate route 410A because the ETA is shorter. Candidate route 410A can be selected even though route 410B does not include travel through advertisement constraint area 315. Additionally and/or alternatively, if the threshold time difference is 60 seconds, or one minute, the operations computing system 135 can determine that the difference is under the threshold. For instance, candidate route 410B can be chosen because it does not include the vehicle to travel withing advertisement constraint area 315 and the difference in time (e.g., ETA, etc.) is less than the time threshold. A similar analysis can be performed for the difference in distance traveled between the two locations and/or difference in user experience measure.

Figure 5:
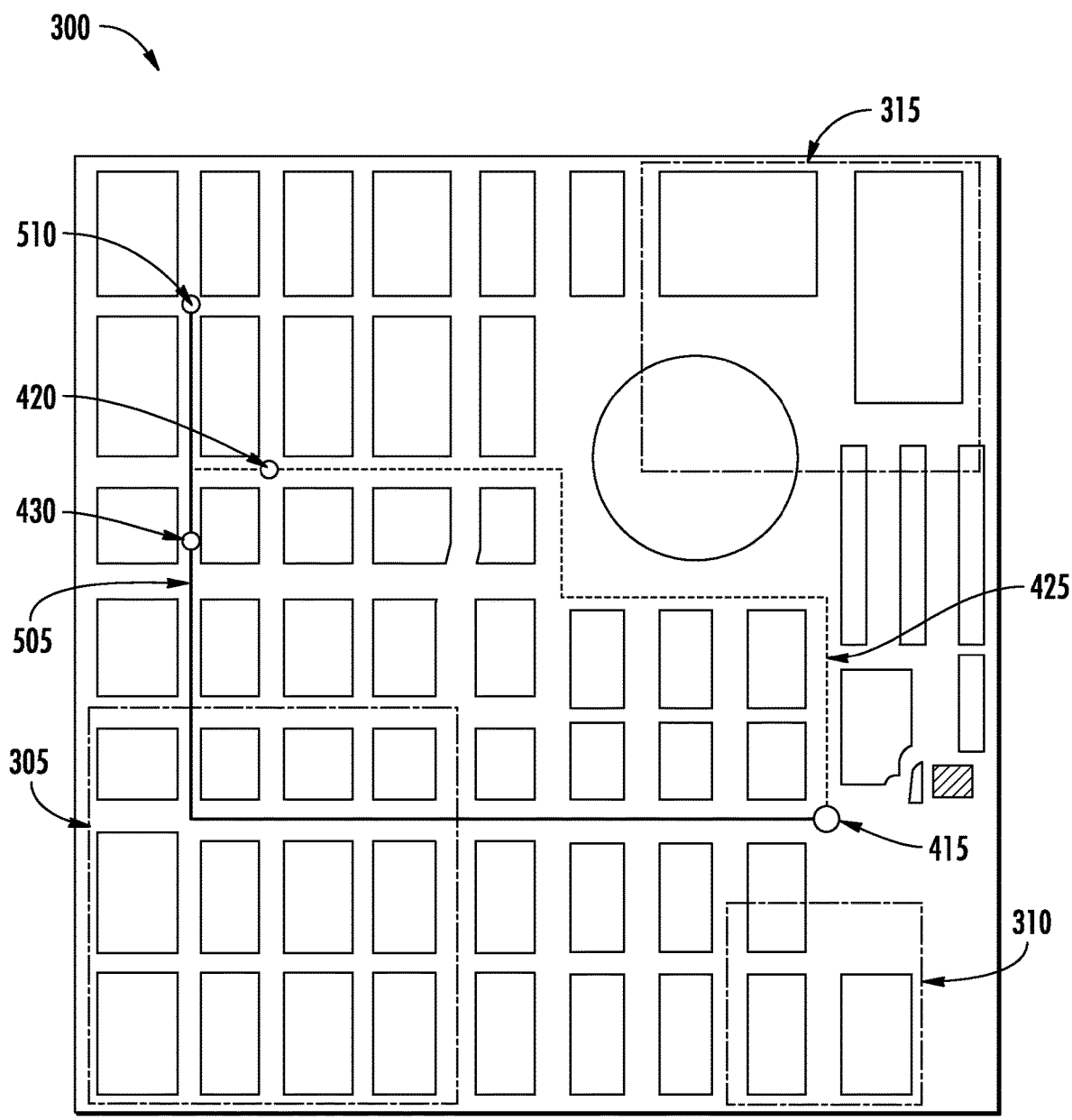
FIG. 5 depicts an example geographic area according to example embodiments of the present disclosure.

The operations computing system 135 can select a vehicle of the candidate vehicles 405 to perform a vehicle service in accordance with the vehicle service request. By way of example, the operations computing system 135 can select candidate vehicle 405B to perform a vehicle service associated with the vehicle service request 140 for user 125. Turning to FIG. 5, the operations computing system 135 can determine a selected route 505 from the selected vehicle origin location 510 to the pick-up location 415 associated with the vehicle service request 140.

In some embodiments, the computing system can obtain location data indicative of one or more locations of the selected vehicle. The one or more locations can include an origin location 510 of the selected vehicle. The origin location 510 can be a location of the vehicle when the vehicle receives the vehicle service request 140. The one or more locations of the selected vehicle can include a current location 420 (e.g., a real-time location of the selected vehicle, etc.). The one or more locations can be determined from location data associated with a user device (e.g., a user device 145 associated with operator 150, etc.) and/or a vehicle device (e.g., vehicle device 110, etc.).

The operations computing system 135 can determine, based on the one or more locations, a route deviation 425 by selected vehicle. For example, the route deviation 425 can occur as the selected vehicle travels between an origin location 510 of the selected vehicle and the pick-up location 415 associated with the vehicle service request 140. One method for determining a route deviation (e.g., route deviance, route variance, route detour, etc.) can include determining a current location 420 of the selected vehicle. The operations computing system 135 can compare data indicative of the expected location 430 of the selected vehicle along selected route 505 to data indicative of a current location 420 of the selected vehicle. A difference between the expected location of the selected vehicle 430 and current location 420 can be determined. If the difference is above a threshold, the operations computing system 135 can detect that a route deviation has occurred. The threshold can be determined in any reasonable manner. The threshold can be set ahead of time as a specific distance, can be calculated based on a formula and/or percentage, etc. In response to determining a route deviation, operations computing system may determine an updated route 425 associated with the route deviation.

Based on determining the route deviation 425, the operations computing system 135 can cause an adjustment to the display device positioned on the exterior of selected vehicle. Adjustment to a display device can include at least one of: (i) ceasing display of the selected advertisement content item, (ii) pausing display of the selected advertisement content item, (iii) adjusting one or more attributes of the selected advertisement content item, and/or (iv) replacing the selected advertisement content item with a different advertisement content item. The computing system can determine the different advertisement content item based on the route deviation. By way of example, the route deviation can involve the selected vehicle travelling through an area that would violate a constraint associated with the advertisement content item that is currently being displayed. In response, the adjustment to the display device can include ceasing display of the selected advertisement content item. In an additional and/or alternative example, the advertisement content item can include a subset of advertisement content items (e.g., a first advertisement related to a movie, a second advertisement related to a restaurant, and a third advertisement related to a happy hour drink special, etc.). The computing system can determine that the route deviation will require the selected vehicle to travel through a school zone (e.g., by obtaining data associated with the geographic area, etc.). The computing system can communicate data that can pause the display of the selected advertisement content item to, for example, prevent the happy hour drink special advertisement from appearing while the vehicle is located within a specific distance of the school zone. Any advertisement targeting and/or advertisement constraints can be used by the computing system to determine an adjustment to the display device. The computing system can adjust one or more attributes of the selected advertisement content by, for example, removing a portion of an advertisement for a restaurant that includes an alcoholic drink. In some implementations, the computing system can determine to replace the selected advertisement content item altogether.

A different advertisement content item can be selected based on updated route 425. For example, the operations computing system 135 can determine an updated route for the vehicle to the pick-up location 415 (or the destination location) based on a detected route deviation. Based on the updated route (and the areas in which the vehicle is to travel), the operation computing system 135 can determine whether a different advertisement content item should be displayed via the display device positioned on the exterior of the vehicle, in a manner similar to that described herein.

Additionally and/or alternatively, detecting route deviation 425 can cause a content item to be displayed on a user device (e.g., user device 145, etc.) associated with an operator (e.g., operator 150, etc.). For example, a message can be sent through an application (e.g., application 147, etc.) on a user device (e.g., user device 145, etc.) including a message. The message can include, for example, various information such as an updated route 425 based on the detected route deviation, a message instructing the operator to avoid route deviations, an incentive for travelling on a selected route, etc.

In some implementations, the operations computing system 135 can confirm that the selected vehicle is travelling along an expected route. For example, the computing system can obtain data indicative of the selected vehicle being located at the expected location 420 of the selected vehicle, which can indicate that the selected vehicle is travelling along the selected route 505.

In some implementations, the operations computing system 135 can determine a time for displaying content based on a relative distance/time between the vehicle and another location. For instance, turning to FIG. 6, the selected vehicle can be positioned at location 605. Location 605 can be a location along selected route 505 and within a threshold distance of pick-up location 415. As discussed in the present disclosure, a threshold distance can be determined by a variety of methods. For example, a threshold distance can be predetermined, calculated by a formula, and/or determined by any other reasonable means.

In some embodiments, display device (e.g., display device 115, etc.) positioned on the exterior of selected vehicle (e.g., vehicle 105, etc.) can be off (e.g., not displaying an advertisement content item, etc.). The operations system 135 can communicate data that initiates display of a selected advertisement content item. The operations computing system 135 can determine that the selected vehicle is within a threshold of pick-up location 415 associated with the vehicle service request 140. The operations computing system 135 can communicate data that initiates the display of the selected advertisement content item (e.g., advertisement content item 195, etc.) based on a determination that the selected vehicle is within the threshold distance/and or time of the pick-up location 415. Additionally and/or alternatively, display device (e.g., display device 115, etc.) positioned on the exterior of selected vehicle (e.g., vehicle 105, etc.) can be currently displaying an advertisement content item. The operations computing system 135 can determine the selected vehicle is within a threshold of pick-up location 415. In response to determining the selected vehicle is within a threshold of pick-up location 415, the operations computing system 135 can send data that initiates display of a different advertisement content item. For example, the different advertisement content item can be relevant to a characteristic of the pick-up location 415 associated with vehicle service request 140 (e.g., geographic location, store, event, etc.). Additionally and/or alternatively, the different advertisement content item can be tailored to the user 125 associated with the vehicle service request 140. For example, the display device positioned on the exterior of the selected vehicle can display an advertisement for a particular restaurant that is popular amongst individuals generally located within proximity of the pick-up location. As the vehicle approaches the pick-up location, the advertisement content item can be changed to include a particular food item of that restaurant that the user has purchased in the past (e.g., as indicated in previous vehicle service usage data, etc.).

In some implementations, an advertisement content item can be adjusted based on the selected vehicle waiting at a pick-up location 415. For instance, operations computing system 135 can obtain data indicating the selected vehicle has arrived at the pick-up location 415 (e.g., is within a threshold distance, etc.). The operations computing system 135 can determine a predetermined amount of time has passed (e.g., greater than 1 minute, 2 minutes, etc.). In response to determining the predetermined amount of time has passed, the operations computing system 135 can communicate data indicative of a request for a new advertisement content item for display (e.g., to an advertisement server 175, etc.). This can include, for example, an advertisement content item associated with another product, service, location, event, etc. that may be of interest to the individuals within proximity of the pick-up location 415. In some implementations, the new advertisement content item can include the same product or service as the previous advertisement content item with adjusted content such as, for example, a discount code, a particular item to order, etc. The operations computing system 135 can communicate data that initiates the display of the new selected advertisement content item on the display device 115 positioned on the exterior of vehicle 105.

The operations computing system 135 can determine a selected route 610 for the selected vehicle to travel between a pick-up location 415 and a destination location 615. For instance, route 610 can be a selected route from the pick-up location 415 (e.g., pick-up location associated with vehicle service request 140, etc.) to the destination location 615 (e.g., destination location associated with vehicle service request 140, etc.).

The operations computing system 135 can determine, from among one or more candidate routes and one or more candidate advertisement items, a selected route (e.g., route 505 and/or route 610, etc.) and a selected advertisement content item based on an advertisement target area (e.g., advertisement target area 305 and/or advertisement target area 310, etc.). The advertisement target area can include a geographic area through which the selected route travels.

Figure 6:
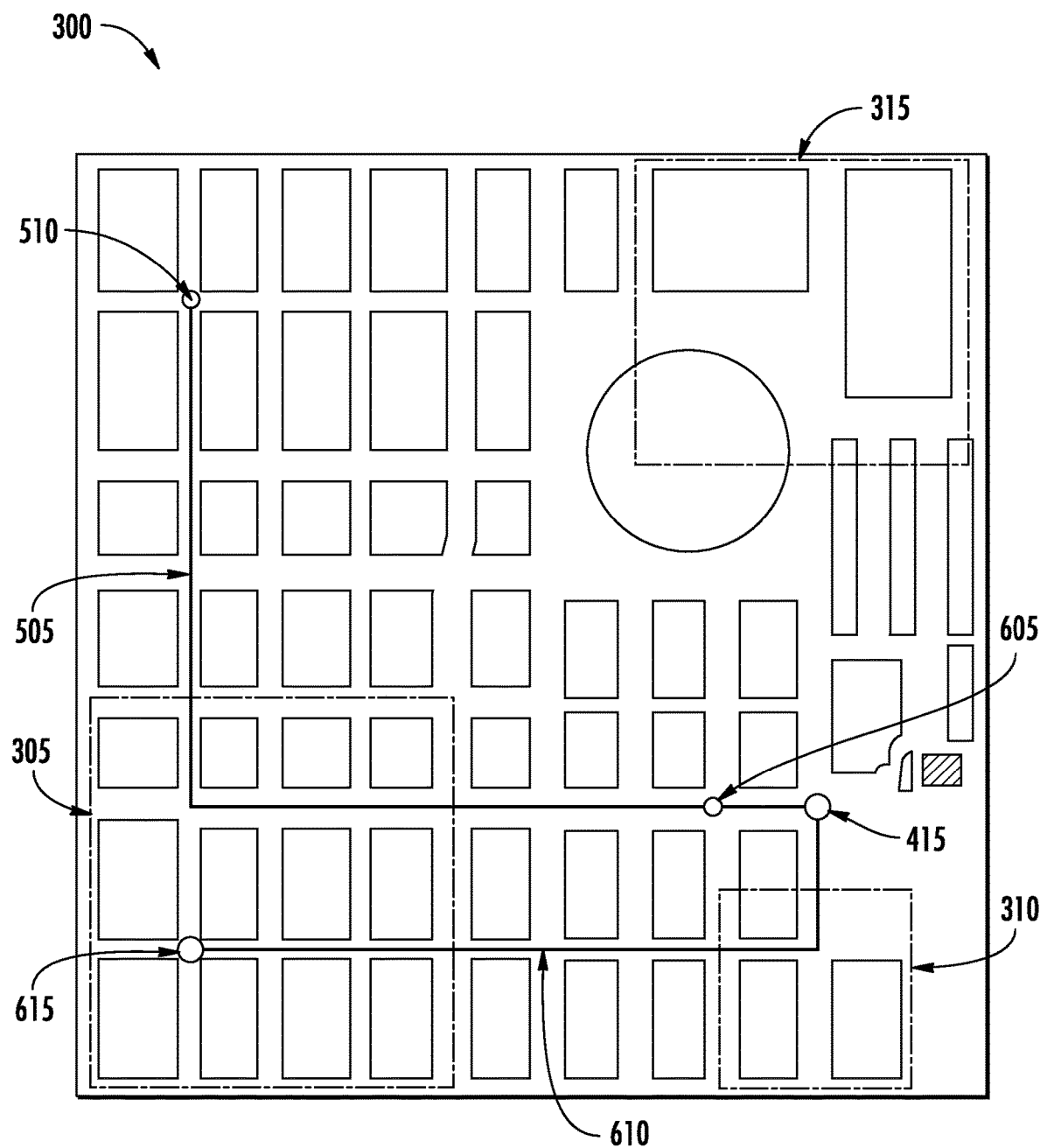
FIG. 6 depicts an example geographic area according to example embodiments of the present disclosure.
Figure 7:
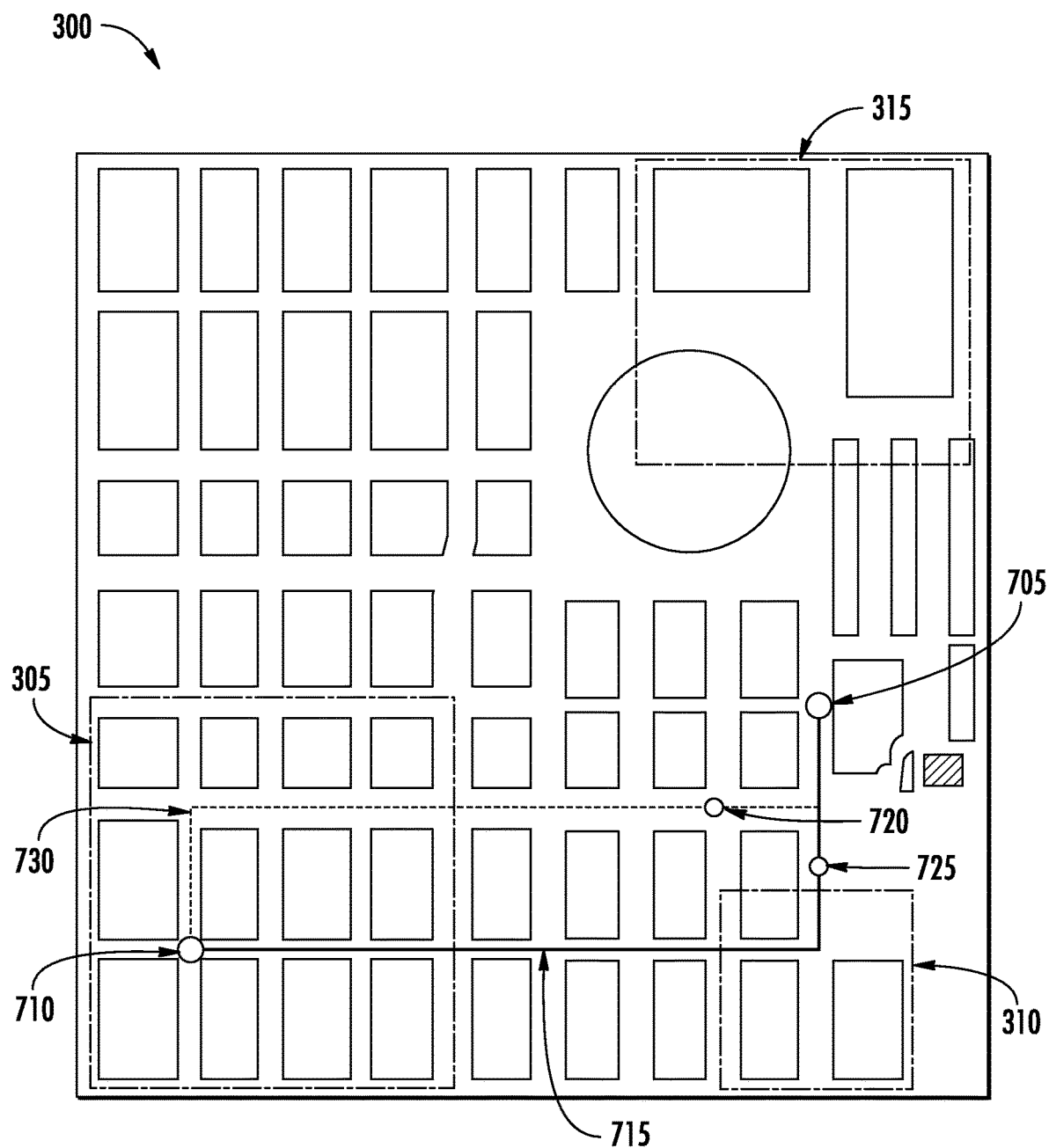
FIG. 7 depicts an example geographic area according to example embodiments of the present disclosure.

The operations computing system 135 can communicate data indicative of route information to a selected vehicle (e.g., a device associated therewith, etc.), which can include a selected route from a pick-up location to a destination location. As depicted in FIG. 7, a vehicle service request can indicate a pick-up location 705 for a vehicle service associated with a user (e.g., user 125, etc.). The vehicle service request (e.g., vehicle service request 140, etc.) can indicate a destination location 710 (e.g., a desired future location, etc.) for the user 125. A selected route 715 can be selected based on the selected route 715 requiring the selected vehicle 105 to travel through second advertisement target area 310 and first advertisement target area 305. The operations computing system can obtain data indicative of one or more locations of the selected vehicle. For example, the one or more locations can include a current location of the selected vehicle 720 and an expected location of the selected vehicle 725. In some instances, the current location of the selected vehicle 720 and the expected location of the selected vehicle 725 can be within a threshold. In some instance, the current location of the selected vehicle 720 and the expected location of the selected vehicle 725 can be outside a threshold. If the current location of the selected vehicle 720 and the expected location of the selected vehicle 725 are outside a threshold, the operations computing system 135 can determine a route deviation has occurred. A route deviation can be associated with an updated route 730. In some instances, a route deviation can occur between an origin location of a selected vehicle and a pick-up location (e.g., as depicted in FIG. 6, etc.). Additionally and/or alternatively, a route deviation can occur between a pick-up location and a destination location (e.g., as depicted in FIG. 7, etc.) and/or any other time.

Figure 8:
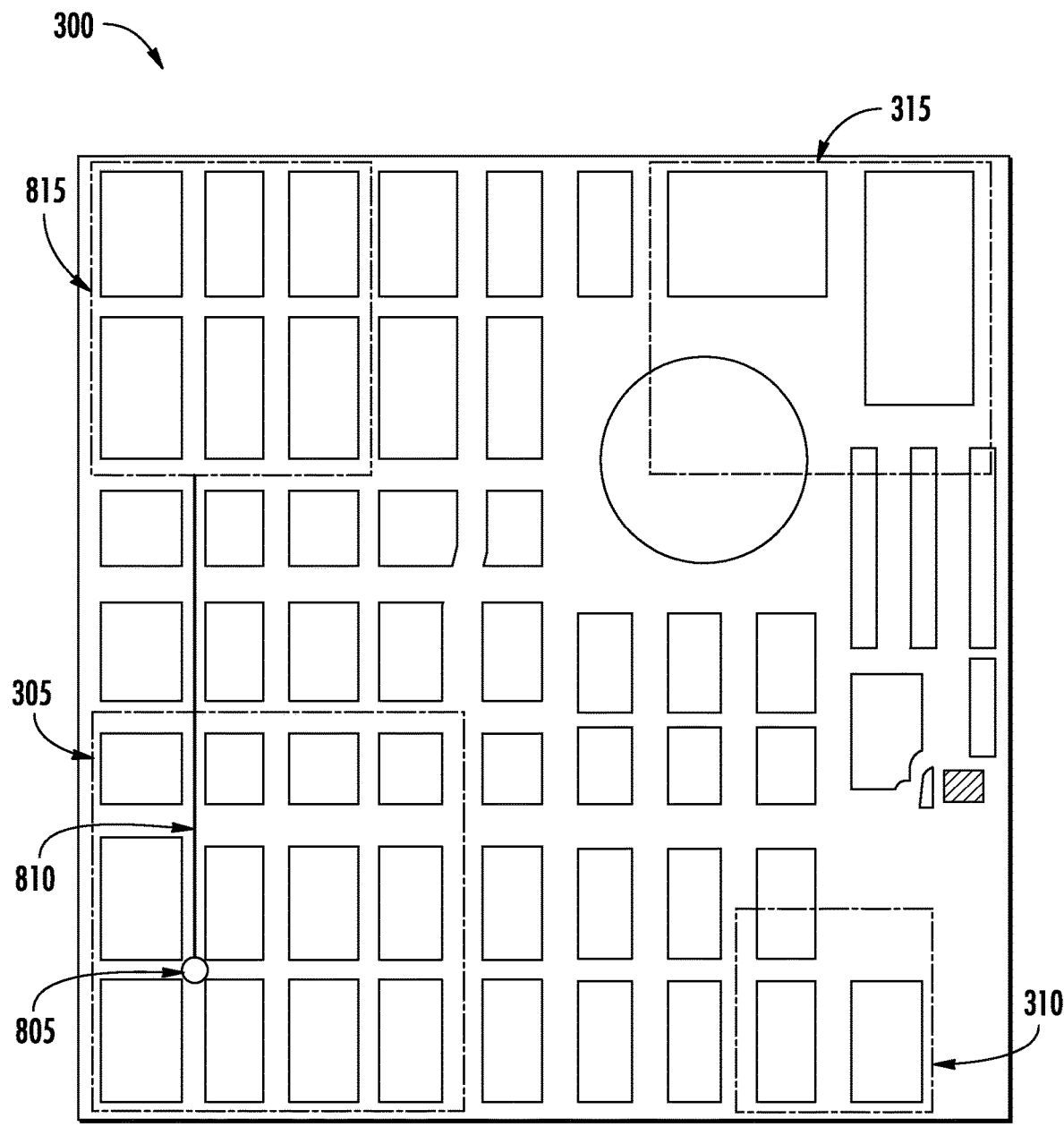
FIG. 8 depicts an example geographic area according to example embodiments of the present disclosure.

The operations computing system 135 can determine that a selected vehicle has completed a vehicle service. For example, the operations computing system can determine the selected vehicle has arrived at a destination location associated with a user request. The operations computing system 135 can obtain data indicative of a user input (e.g., operator input, etc.) indicating the completion of a vehicle service. The operations computing system 135 can determine the selected vehicle has not received a subsequent vehicle service request. With reference to FIG. 8, a vehicle can be located at a destination location 805 associated with a recently completed vehicle service request (e.g., destination location 615, 710, etc.). The operations computing system 135 can obtain data indicative of a desired geographic area 815 to direct the vehicle. The desired geographic area 815 can be, for example, an area of high demand for vehicle services (e.g., vehicle services for transportation, delivery, etc.), an advertisement target area, an area comprising a predetermined route associated with an advertisement content item, etc. The operations computing system 135 can obtain data indicative of a route 810 for the vehicle to travel between destination location 805 and geographic area 815. The operations computing system 135 can communicate (e.g., to a user device of an operator, etc.) data indicative of a route to geographic area 815.

Figure 9:
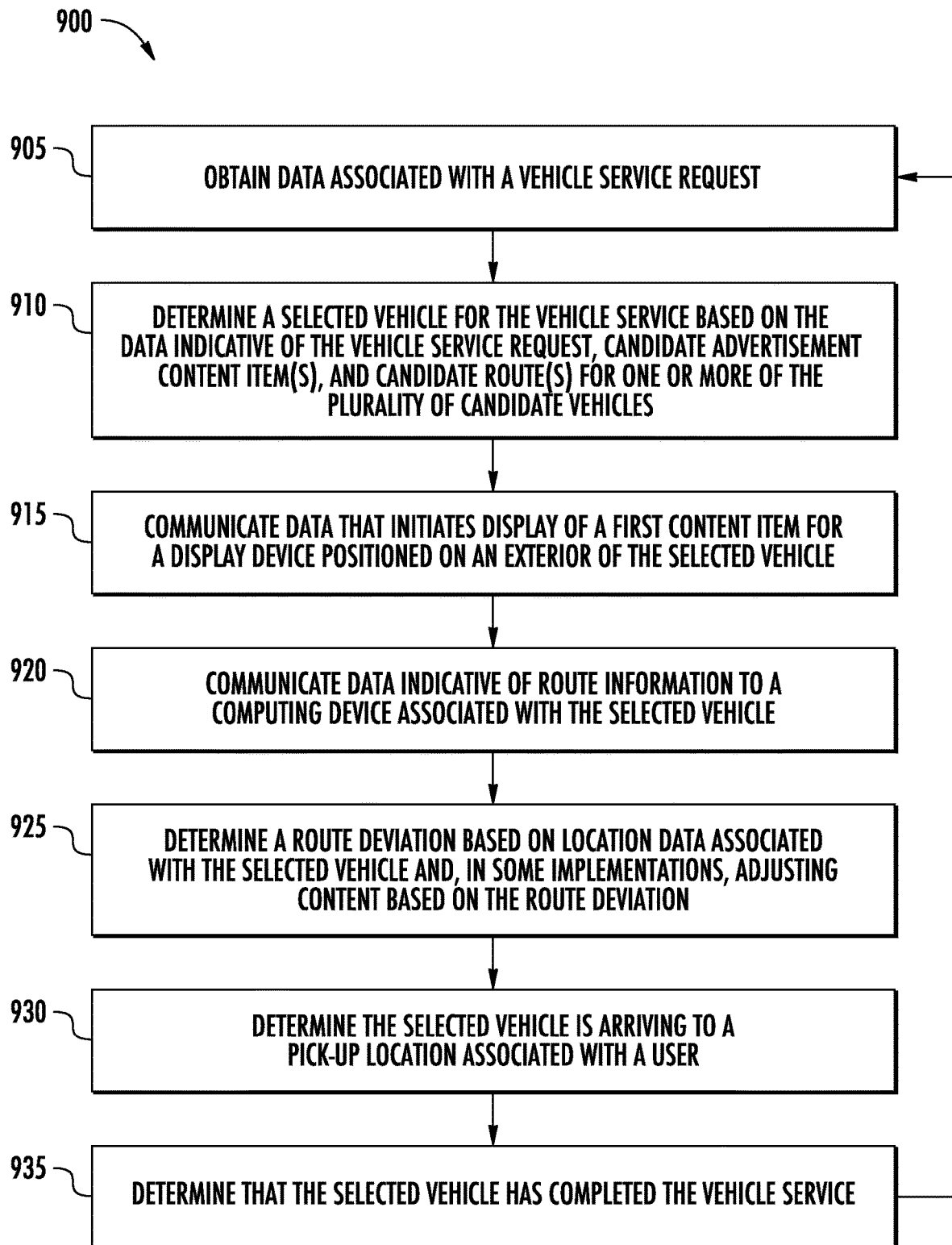
FIG. 9 depicts a flowchart of an example method according to example embodiments of the present disclosure.

FIG. 9 depicts a flowchart diagram of an example method for matching, routing, and controlling vehicles to transport users and/or items according to example embodiments of the present disclosure. One or more portion(s) of the method 900 can be implemented by one or more computing devices such as, for example, the computing devices/systems described in FIGS. 1, 12, and/or 13. Moreover, one or more portion(s) of the method 900 can be implemented as an algorithm on the hardware components of the device(s) described herein (e.g., as in FIGS. 1, 12, and/or 13, etc.). For example, a computing system can include one or more processors and one or more non-transitory, computer-readable media storing instructions that are executable by the one or more processors to cause the computing system to perform operations, the operations including one or more of the operations/portions of method 900. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (905), the method 900 can include obtaining data associated with a vehicle service request. For instance, a computing system (e.g., an operations computing system associated with a service entity) can obtain data associated with a vehicle service request. The data associated with the vehicle service request can be indicative of a pick-up location and a destination location associated with a vehicle service request. As described herein, the vehicle service request can include at least one of: (i) a request for a user transportation service, (ii) a request for a delivery service, or (iii) a request for a courier service. By way of example, a computing system can identify a user requesting a vehicle service. In response, the computing system can create a vehicle service instance. The vehicle service instance can contain data indicative of user, service parameters, and/or other information. After matching a selected vehicle (as described herein), the vehicle service instance can include data indicative of a vehicle/operator, operator preferences, and/or vehicle/operator characteristics.

At (910), the method 900 can include determining a selected vehicle for the vehicle service based on the data indicative of the vehicle service request, candidate advertisement content item(s), and candidate route(s) for one or more of the plurality of candidate vehicles. For instance, the computing system can determine, from among a plurality of candidate vehicles, a selected vehicle for the vehicle service request based on the data indicative of the vehicle service request, one or more candidate advertisement content items, and one or more candidate routes for one or more of the plurality of candidate vehicles. In some implementations, the computing system can determine a selected vehicle (e.g., the vehicle closest to the pick-up location, etc.) and then determined a selected advertisement content item and a selected route therefrom. In some implementations, the computing system can determine a selected advertisement content item and then determine a selected vehicle and a selected route therefrom. In some implementation, the computing system can determine a selected route (and the associated vehicle) and then determine a selected advertisement content item therefrom.

In some implementations, as described herein, the computing system can determine, from among the one or more candidate routes and the one or more candidate advertisement content items, the selected route and the selected advertisement content item based on an advertisement target area. The advertisement target area can include a geographic area through which the selected route travels. As described herein, the selected advertisement content item can be chosen in part based on an advertisement target area. The advertisement target area can be based on at least one of: (i) a targeting zone, (ii) a predefined geographic radius, (iii) a geofence, (iv) one or more regional characteristics, or (v) one or more attributes of one or more individuals associated with the geographic area. For example, an advertisement target area can be a targeting zone. Targeting zones can be based in part on data indicative of geographic radii and/or geofences. Regional characteristics can include data such as age, purchase history, popular locations, etc. Historic demand data can include data such as foot traffic to a physical store location, a user downloading an application, a user purchasing an item, a user signing up for a subscription, a user signing up for a mailing list, a user creating a user profile, advantageous advertisement placement to drive foot traffic to a particular physical store location, etc.

As described herein, the computing system can determine, from among the one or more candidate routes, the selected route based on at least one of: (i) a distance threshold; (ii) a time threshold; or (iii) a user experience measure. By way of example, the computing system can compare one or more candidate routes of the one or more candidate vehicles to determine the selected vehicle and the selected route for the vehicle. The computing system can determine a first candidate route and/or second candidate route. The computing system can obtain data indicative of the first candidate route travelling through an advertisement constraint area. The computing system can obtain data indicative of the second candidate route avoiding the advertisement constraint area and taking a reasonable amount of additional time compared to the first candidate route (e.g., 30 seconds, etc.). The computing system can communicate data indicative of the second candidate route as the selected route for the selected vehicle.

As described herein, the selected vehicle can be determined based on at least one of: (i) an advertisement constraint, (ii) a user preference, (iii) a driver preference, (iv) map data, (v) vehicle characteristic data, or (vi) a subject matter of the selected advertisement content item. By way of example the computing system can obtain data indicative of which candidate vehicle can perform the vehicle service request the fastest, which candidate vehicle has characteristics that align with user preference, which candidate vehicle has candidate routes that can decrease cost to a user and/or increase revenue for a vehicle operator, and/or any other relevant data. The obtained data can be used to determine the selected vehicle to perform the vehicle service request.

Figure 10A:
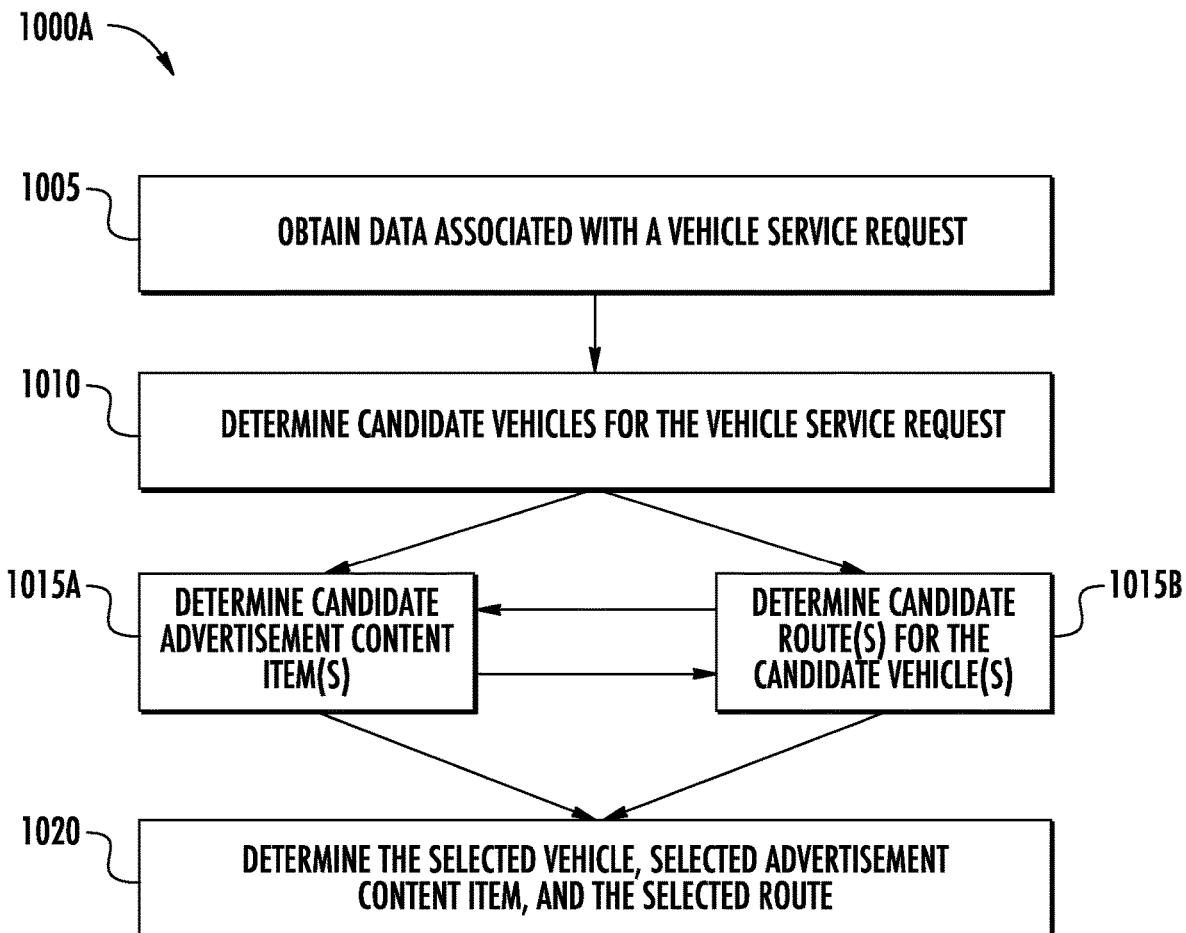
FIG. 10A-10C depict flowcharts of example methods according to example embodiments of the present disclosure.

With reference to FIG. 10A, method 1000A illustrates an example method for determining a selected vehicle, a selected advertisement content item, and a selected route according to example aspects of the present disclosure. The operations of method 1000A can be implemented in addition to or as sub-operations to any other methods herein (e.g., operation 910 of method 900, etc.). One or more portion(s) of method 1000A can be implemented by one or more computing devices such as, for example, the computing devices/systems described in FIGS. 1, 12, and/or 13. Moreover, one or more portion(s) of method 1000A can be implemented as an algorithm on the hardware components of the device(s) described herein (e.g., as in FIGS. 1, 12, and/or 13, etc.). For example, a computing system can include one or more processors and one or more non-transitory, computer-readable media storing instructions that are executable by the one or more processors to cause the computing system to perform operations, the operations including one or more of the operations/portions of method 1000A. FIG. 10A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (1005), method 1000A can include obtaining data associated with a vehicle service request. For instance, the computing system can obtain data associated with a vehicle service request, as previously described. By way of example, the computing system can obtain data associated with a user, a vehicle service instance, an operator/vehicle, etc.

At (1010), method 1000A can include determining candidate vehicles for the vehicle service request. For instance, the computing system can determine one or more candidate vehicles to perform a vehicle service request. By way of example, the computing system can determine one or more vehicles are on-line and available to perform a vehicle service request. The candidate vehicles can, for example, be within a threshold distance and/or time from the pick-up location associated with the vehicle service request.

At (1015A), method 1000A can include determining candidate advertisement content items. For instance, the computing system can determine one or more candidate advertisement content items. In some implementations, the computing system can communicate a request for the one or more candidate advertisement content items to a third-party computing system associated with an advertisement content management service provider. The computing system can obtain the one or more candidate advertisement content items from the third-party computing system.

By way of example, the computing system can communicate data indicative of a request for an advertisement content item to an advertisement engine. An advertisement engine and/or advertisement server can respond to the request by obtaining data indicative of an advertisement content item from an advertisement source service. The candidate advertisement content item(s) can include advertisement content item(s) that may be available for display on a display device positioned on the exterior of a vehicle. In some implementations, the candidate advertisement content item(s) can include advertisement content items that are queued for display, are identified as particularly relevant to an associated geographic area in which the vehicle will travel, are identified as relevant to an upcoming event (e.g., concert, etc.), and/or other candidate advertisement content items. In some implementations, the candidate advertisement content item(s) can be determined based on data associated with another service of the service entity. For example, the computing system can access data indicative of delivery service order history for the geographic area, pick-up/drop-off location history, etc. to determine the type of food, restaurants, locations, etc. utilized by individuals in the geographic area. This can help select relevant advertisement content items.

Before, after, and/or concurrently with determining the candidate advertisement content item(s), at (1015B), method 1000A can include determining candidate routes for the candidate vehicles. For instance, the computing system can determine one or more candidate routes. By way of example, the computing system can determine one or more candidate routes for each of the one or more candidate vehicles. A candidate route can indicate a route from an original location of a candidate vehicle to the pick-up location associated with the vehicle service request. In some implementations, a candidate route can travel within an advertisement target area and/or avoid an advertisement constraint area.

At (1020), method 1000A can include determining the selected vehicle, the selected advertisement content item, and the selected route. For instance, the computing system can determine the selected vehicle, the selected advertisement content item, and the selected route from among the candidate vehicle(s), candidate advertisement content item(s), and the candidate route(s). The computing system can be configured to make these determinations based on an initial selection of any one of them.

In some implementations, the computing system can determine the one or more candidate routes and determining the one or more candidate advertisement content items based on the one or more candidate routes. The computing system can determine the selected route and the selected advertisement content item based on the one or more candidate routes and the one or more candidate advertisement content items. By way of example, the computing system can identify a selected vehicle and a candidate route for a selected vehicle as the selected route. The selected route can include the vehicle travelling through a geographic area. The geographic area can be associated with an advertisement constraint that would prevent the display of a first candidate advertisement content item (e.g., for an alcoholic beverage, etc.) in the area (e.g., due to an alcohol advertisement restriction, etc.). A second advertisement content item (e.g., for a grocery store, etc.) may not be associated with an advertisement constraint for the same geographic area. Thus, the computing system can determine the second candidate advertisement content item as the selected advertisement content item based on the selected route for the selected vehicle.

In some implementations, the computing system can determine the one or more candidate advertisement content items and determining the one or more or more candidate routes based on the one or more candidate advertisement content items. The computing system can determine the selected route and the selected advertisement content item based on the one or more candidate routes and the one or more candidate advertisement content items. By way of example, the computing system can determine that a first advertisement content item would be particularly relevant for a geographic area, is next is the queue for advertisement display, would help decrease the cost of the vehicle service to the user and/or increase earnings of the vehicle operator, etc. From there, the computing system can determine a selected vehicle and a selected route that would be advantageous for displaying the selected advertisement content item while still providing a good experience for the vehicle operator and the user. For example, the computing system can determine that a first candidate route includes a first candidate vehicle travelling through an advertisement target area (and/or avoids a constraint area). The computing system can determine that the first candidate route also does not exceed a distance threshold, a time threshold, and/or a user experience measure, as described herein. Thus, the computing system can determine the first candidate route as the selected route and the associated candidate vehicle as the selected vehicle for displaying the selected advertisement content item. In some implementations, the computing system can also generate the selected route to travel within an advertisement target area for the selected advertisement content item such that the associated vehicle travels within the target area but does not violate a time, distance, or user experience threshold.

Returning to FIG. 9, at (915), method 900 can include communicating data that initiates display of a first content item for a display device positioned on an exterior of the selected vehicle. For instance, the computing system can communicate data that initiates display of a selected advertisement content item by a display device positioned on an exterior of the selected vehicle. As described herein, the display device positioned on an exterior of the vehicle can include a cartop advertisement device. By way of example, the computing system can obtain data associated with an advertisement content item from an advertisement engine. The advertisement engine can be associated with a first party (e.g., the service entity providing the vehicle service, etc.) and/or can be associated with a third-party (e.g., a third-party not associated with the service entity providing the vehicle service, etc.). An advertisement content item can be an audio advertisement content item, a visual advertisement content item, and/or any other available advertisement content item medium. The display device can obtain the data indicative of the selected advertisement content item, process the data, and present the advertisement content item. This can include, for example, rendering the visual aspects of the selected advertisement content item and/or projecting any audible aspects of the selected advertisement content item.

At (920), method 900 can include communicating data indicative of route information to a computing device associated with the selected vehicle. For instance, the computing system can communicate data indicative of route information to a computing device associated with the selected vehicle. The route information can include a selected route to the pick-up location. By way of example, the route information can include directions indicative of a route from an origin location of the selected vehicle to the pick-up location associated with the vehicle service request. In addition, or alternatively, route information can include directions indicative of a route from the pick-up location associated with the vehicle service request to the destination location of the service request. Route information can be indicative of any form of direction, route, path, etc. between two distinct locations. Route information can include or be associated with map data. The computing device associated with the selected vehicle can include, for example, a user device associated with the vehicle and/or a user device associated with operator.

At (925), method 900 can include determining a route deviation based on location data associated with the selected vehicle. For instance, the computing system can obtain location data indicative of one or more locations of the selected vehicle. The computing system can determine, based on the one or more locations, a route deviation by the selected vehicle. The route deviation can occur as the selected vehicle travels between an origin location of the selected vehicle and the pick-up location associated with the vehicle service request. In addition, or alternatively, the route deviation can occur as the selected vehicle travels between the pick-up location and the destination location associated with the vehicle service request. By way of example, the computing system can obtain location data indicative of a current location of the selected vehicle. The computing system can determine that the current location of the selected vehicle is not within a threshold of an expected location of the selected vehicle along the selected route. The difference can be determined by comparing data indicative of a vehicle position (e.g., geographic location, etc.). A route deviation can include a selected vehicle travelling along a new and/or updated route. The new updated route can include the selected vehicle travelling through the same advertisement target areas and/or advertisement constraint areas as the selected route. Additionally and/or alternatively, the new and/or updated route can include the selected vehicle travelling through different advertisement target areas and/or advertisement constraint areas as the selected route.

In some implementations, at (925), based on the route deviation, the computing system can determine an adjustment to the display device positioned on the exterior of the vehicle. By way of example, the route deviation can be indicative of an updated route for the selected vehicle. The updated route can include the selected vehicle travelling through different advertisement target areas and/or advertisement constraint areas as the selected route. For example, a selected route can require the vehicle to travel through a busy street in a downtown area. This can be associated with a high value advertisement targeting area. The updated route can avoid travelling through the high value advertisement targeting area. The computing system can determine based on data associated with the update route and data associated with the advertisement content item that adjusting the display is required.

The adjustment to the display device can include at least one of: (i) ceasing display of the selected advertisement content item, (ii) pausing display of the selected advertisement content item, (iii) adjusting one or more attributes of the selected advertisement content item, or (iv) replacing the selected advertisement content item with a different advertisement content item. The computing system can determine the different advertisement content item based on the route deviation. By way of example, the route deviation can involve the selected vehicle travelling through an area that would violate a constraint associated with the advertisement content item that is currently being displayed. In response, the adjustment to the display device can include ceasing display of the selected advertisement content item. In an additional, or alternative example, the advertisement content item can include a subset of advertisement content items (e.g., a first advertisement related to a movie, a second advertisement related to a restaurant, and a third advertisement related to a happy hour drink special, etc.). The computing system can determine that the route deviation will require the selected vehicle to travel through a school zone (e.g., by obtaining data associated with the geographic area, etc.). The computing system can communicate data that can pause the display of the selected advertisement content item to, for example, prevent the happy hour drink special advertisement from appearing while the vehicle is located within a specific distance of the school zone. Any advertisement targeting and/or advertisement constraints can be used by the computing system to determine an adjustment to the display device. The computing system can adjust one or more attributes of the selected advertisement content by, for example, removing a portion of an advertisement for a restaurant that includes an alcoholic drink. In some implementations, the computing system can determine to replace the selected advertisement content item altogether from, for example, a restaurant to a show that may be appealing to all members of a family.

At (930), method 900 can include determining the selected vehicle is arriving to a pickup location associated with a user. For instance, the computing system can communicate the data that initiates the display of the selected advertisement content item including determining that the selected vehicle is within a predetermined threshold of the pick-up location associated with the vehicle service request. Additionally and/or alternatively, the computing system can communicate the data that initiates the display of the selected advertisement content item based on determining that the vehicle is within the predetermined threshold of the pick-up location. By way of example, the computing system can determine that an advertisement content item tailored to interests of the user (e.g., user associated with the vehicle service request, etc.) should be displayed as the vehicle arrives at the pick-up location. Additionally and/or alternatively, the computing system can determine that an advertisement content item related to the geographic area associated with the pick-up location can be displayed as the vehicle arrives at the pick-up location (e.g., for a restaurant located within a block of the pick-up location, etc.).

At (935), method 900 can include determining that the selected vehicle has completed the vehicle service. For instance, the computing system can determine the selected vehicle has arrived at the destination location. The computing system can obtain data indicative of the completion of the vehicle service request. The computing system can determine the vehicle service request has been completed by the selected vehicle. By way of example, the computing system can obtain data indicative of a current location associated with selected vehicle and/or data indicative of user input indicating that the vehicle service request has been completed. In response, the computing system can obtain data associated with a subsequent vehicle request. In addition, or alternatively, the selected vehicle can re-enter the pool of candidate vehicles for the subsequent vehicle request and method 900 can repeat.

The computing system can apportion revenue generated by displaying the advertisement content item(s). For example, at least a portion of the revenue generated from displaying the advertisement content item(s) can be provided to the operator (e.g., deposited into a linked account). At least a portion of the revenue generated from displaying the advertisement content item(s) can be provided to the user by, for example, reducing the cost of a current or future vehicle service to the user.

Figure 10B:
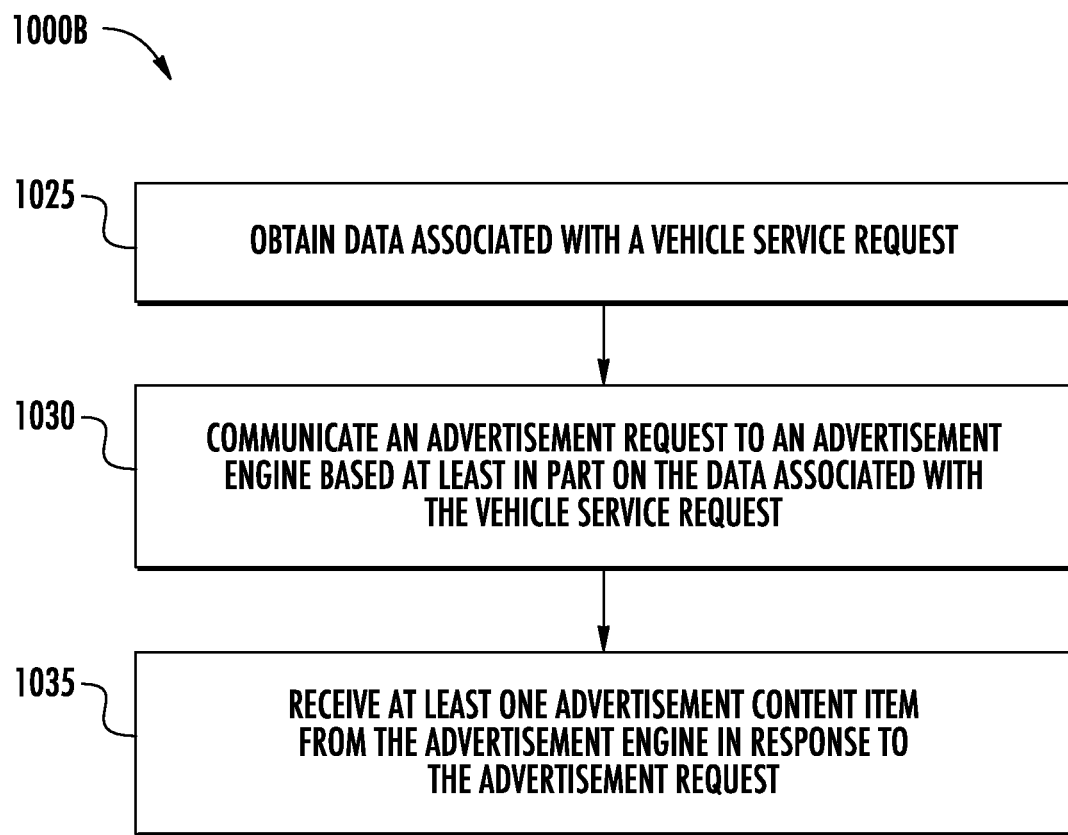

FIG. 10B depicts a flowchart diagram of an example method for obtaining advertisement content item(s) according to example embodiments of the present disclosure. One or more portion(s) of method 1000B can be implemented by one or more computing devices such as, for example, the computing devices/systems described in FIGS. 1, 12, and/or 13. Moreover, one or more portion(s) of method 1000B can be implemented as an algorithm on the hardware components of the device(s) described herein (e.g., as in FIGS. 1, 12, and/or 13, etc.). For example, a computing system can include one or more processors and one or more non-transitory, computer-readable media storing instructions that are executable by the one or more processors to cause the computing system to perform operations, the operations including one or more of the operations/portions of method 1000B. FIG. 10B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (1025), method 1000B can include obtaining data associated with a vehicle service request. For instance, the computing system can obtain data associated with a vehicle service request, as previously described herein.

At (1030), method 1000B can include communicating an advertisement request to an advertisement engine based at least in part on the data associated with the vehicle service request. For instance, the computing system can communicate a request to a third-party computing system associated with an advertisement content management service provider. As described herein, the computing system can communicate a request for the one or more candidate advertisement content items to a computing system associated with a service entity associated with the vehicle service request. By way of example, the operations computing system can communicate an advertisement content item request to an advertisement engine and/or advertisement server. The advertisement content item request can include advertisement constraints data and/or advertisement targeting data. The advertisement server can communicate with an advertisement source service to obtain an advertisement content item. The advertisement server and/or the advertisement source service can be associated with the service entity providing the vehicle service. For example, the advertisement content management service can be an advertisement server associated with the service entity providing the vehicle service. The advertisement server and/or the advertisement source service can be associated with a third-party that is not associated with the service entity providing the vehicle service.

At (1035), method 1000B can include receiving at least one advertisement content item from the advertisement engine in response to the advertisement request. For instance, the computing system can obtain the one or more candidate advertisement content items from the third-party computing system. In addition, or alternatively, the computing system can obtain the one or more candidate advertisement content items from another computing system. By way of example, the advertisement content item can be obtained from a central advertisement database. The advertisement content item can be selected from one or more candidate advertisement content items. The candidate advertisement content items can include a first advertisement content item and/or a second advertisement content item. Each candidate advertisement content item can have associated features. The associated features can include campaign identifiers, advertiser identifiers, time, location, and/or individual identifiers, etc.

The technology of the present disclosure can also allow for the determination, management, and coordination of displaying advertisement content while a vehicle/operator is not performing a vehicle service.

Figure 10C:
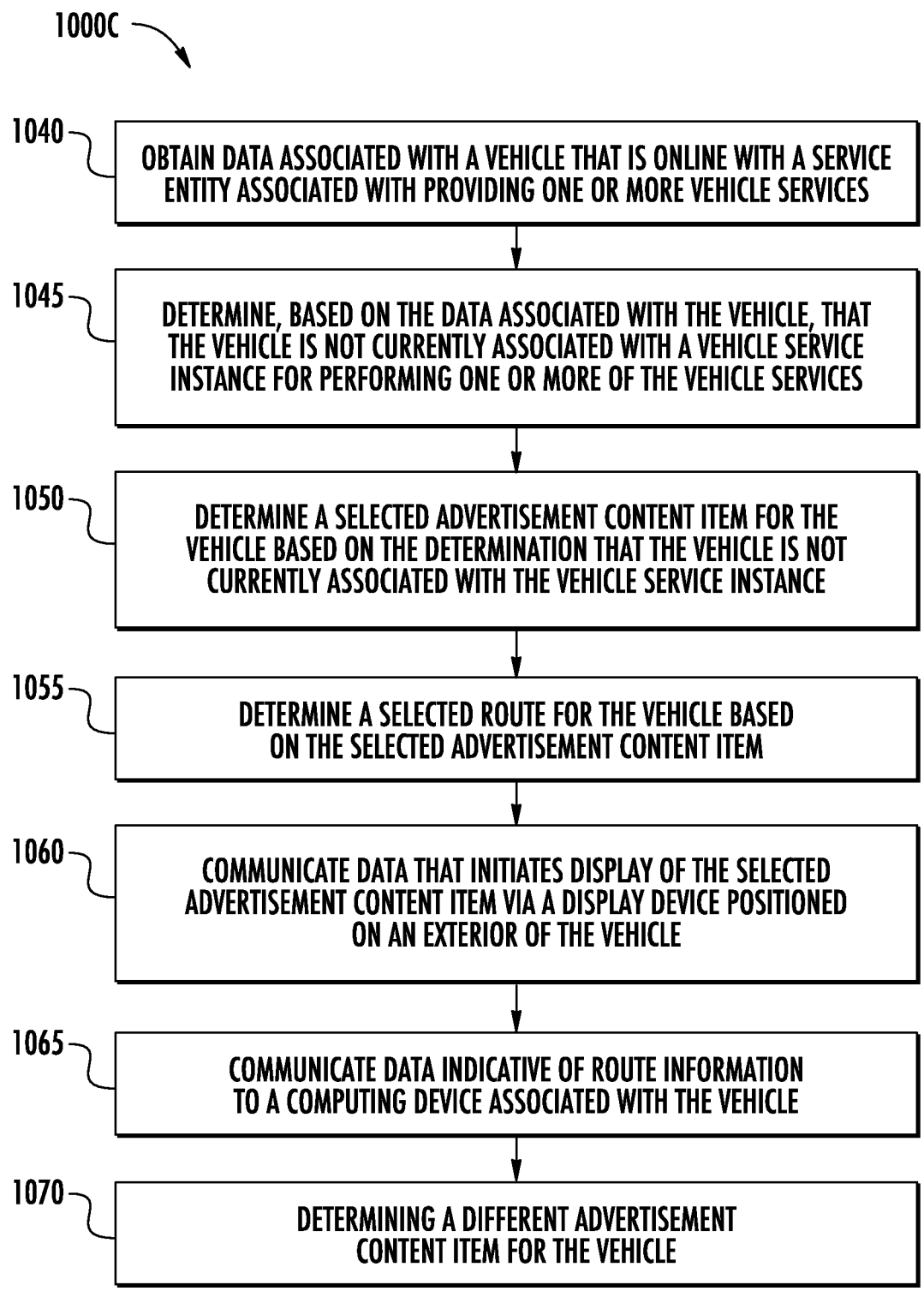

FIG. 10C depicts a flowchart diagram of an example method for matching and routing off-service vehicles/operators based on advertisement content according to example embodiments of the present disclosure. One or more portion(s) of method 1000C can be implemented by one or more computing devices such as, for example, the computing devices/systems described in FIGS. 1, 12, and/or 13. Moreover, one or more portion(s) of method 1000C can be implemented as an algorithm on the hardware components of the device(s) described herein (e.g., as in FIGS. 1, 12, and/or 13, etc.). For example, a computing system can include one or more processors and one or more non-transitory, computer-readable media storing instructions that are executable by the one or more processors to cause the computing system to perform operations, the operations including one or more of the operations/portions of method 1000C. FIG. 10C depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (1040), method 1000C can include obtaining data associated with a vehicle that is online with a service entity associated with providing one or more vehicle services. For instance, a computing system (e.g., an operations computing system associated with a service entity) can obtain data associated with a vehicle that is online with a service entity such as a service entity that is associated with providing one or more vehicle services. As described herein, the data associated with the vehicle can include one or more locations of the vehicle and a heading of the vehicle (e.g., as determined by location data, positioning data, etc. from a device associated with the vehicle, etc.). The computing system can obtain data associated with a geographic area. The data associated with the geographic area can be indicative of at least one of: (i) an advertisement constraint of the geographic area, or (ii) historic demand data associated with the geographic area. The historic demand data can include, for example, historical demand of individuals associated with the geographic area (e.g., people who work, live, travel to, frequently visit, intended audience, etc. the area) for certain goods, services, events, locations, etc. By way of example, the computing system can determine that a vehicle is not currently matched with a vehicle service. The computing system can obtain data indicative of a current location of the vehicle and/or the heading of the vehicle (e.g., expected direction of travel, expected destination location, etc.). The computing system can obtain data associated with geographic areas associated with the current location of the vehicle and/or geographic locations associated with the heading of the vehicle. This can include historical demand data for certain restaurant(s) in the geographic area.

At (1045), method 1000C can include determining, based on the data associated with the vehicle, that the vehicle is not currently associated with a vehicle service instance for performing one or more of the vehicle services. For instance, the computing system can determine, based on the data associated with the vehicle, that the vehicle is not currently associated with a vehicle service instance for performing one or more of the vehicle services. By way of example, the computing system can obtain data indicative of user input on an application associated with the service entity that an operator is available to perform a vehicle service request. The computing system can determine that the operator is not associated with a vehicle service instance. In some implementations, the computing system can determine that the vehicle/operator is not associated with a vehicle service instance based on determining that the vehicle/operator has completed (or is completing) a vehicle service for currently assigned vehicle service instance (e.g., by arriving at or dropping-off a rider/item at a drop-off location, etc.).

At (1050), method 1000C can include determining a selected advertisement content item for the vehicle based on the determination that the vehicle is not currently associated with the vehicle service instance. For instance, the computing system can determine a selected advertisement content item for the vehicle based on the determination that the vehicle is not currently associated with the vehicle service instance. As described herein, the data associated with the vehicle can include one or more locations of the vehicle and a heading of the vehicle. The computing system can determine a selected advertisement content item for the vehicle based on at least one of: (i) the one or more locations of the vehicle, or (ii) the heading of the vehicle. For example, the computing system can utilize the location(s) of the vehicle and/or the heading of the vehicle to determine where the vehicle is (and may be in the future). Based on this, the computing system can determine a selected advertisement content that may be particularly relevant to individuals (e.g., an advertisement audience, etc.) in that geographic area.

In some implementations, the computing system can determine the selected advertisement content item for the vehicle based on at least one of: (i) the advertisement constraint of the geographic area, or (ii) historic demand data associated with the geographic area. By way of example, the computing system can determine a selected advertisement content item for display on a display device positioned on the exterior of the vehicle. The advertisement content item can be selected based on characteristics of geographic areas associated with the vehicle and the predicted future location of the vehicle. For example, in the event that the data associated with the location(s) and/or heading of the vehicle is indicative of travel through an advertisement target area associated with a first candidate advertisement content item, the computing system can identify the first advertisement content item as the selected advertisement content item. In another example, in the event that the data associated with the heading of the vehicle is indicative of travel through an advertisement constraint area associated with a first advertisement content item, the computing system can select an alternative advertisement content item.

As described herein, to help determine selected advertisement content item(s), the computing system can communicate a request for one or more candidate advertisement content items to a third-party computing system associated with an advertisement content management service provider. The computing system can receive candidate advertisement content item(s) and/or a selected candidate advertisement content item form the third-party computing system. By way of example, the computing system can provide data indicative of the vehicle's location(s) and/or heading to an advertisement server. The advertisement server can be configured to select an advertisement content item based on the location(s) and/or heading of the vehicle and provide the selected advertisement content item to the computing system. The selected advertisement content item can include, for example, an advertisement for a new restaurant that recently opened in the area in which the vehicle is (or will be) located. The advertisement server can be configured to communicate data indicative of the selected advertisement content item to the computing system.

At (1055), method 1000C can include determining a selected route for the vehicle based on the selected advertisement content item. For instance, the computing system can determine a selected route for the vehicle based on the selected advertisement content item. As described herein, the computing system can determine the selected route for the vehicle based on the data associated with the geographic area. By way of example, the computing system can first, determine a selected advertisement content item. Based on data indicative of features, advertisement constraints, and/or advertisement targeting associated with the selected advertisement content item, the computing system can determine a selected route for the vehicle.

The computing system can determine a plurality of candidate routes for the vehicle. The plurality of candidate routes for the vehicle can include a first candidate route and a second candidate route. The computing system can determine that the first candidate route includes the vehicle violating the advertisement constraint. The computing system can determine that the second candidate route does not include the vehicle violating the advertisement constraint. The computing system can determine the second candidate route as the selected route for the vehicle.

In addition, or alternatively, the computing system can determine a plurality of candidate routes for the vehicle. The plurality of candidate routes can include a first candidate route and a second candidate route. The computing system can determine that the first candidate route includes travelling through an advertisement target area. The computing system can identify the first candidate route as the selected route for the vehicle. By way of example, a selected advertisement content item can be associated with an advertisement for a new healthy kids' meal option with an associated new toy. A first candidate route can include travelling by a school when school is dismissed. The school can be an advertisement target area for advertisement content items tailored toward parents with school-aged individuals. The first candidate route can be selected due to the potential exposure to a desired population.

The selected route can be a predetermined route associated with displaying the selected advertisement content item. By way of example, an area can be determined as an advantageous and/or target area for advertisement display to result in conversions. Conversions can include, for example, an increase in foot-traffic to a physical store location, etc. An advertisement content item can have a predetermined route (e.g., a loop around a set number of city streets, etc.). The predetermined route can be associated with the advantageous and/or target area for advertisement display to result in conversions.

At (1060), method 1000C can include communicating data that initiates display of the selected advertisement content item via a display device positioned on an exterior of the vehicle. For instance, the computing system can communicate data that initiates display of the selected advertisement content item via a display device positioned on an exterior of the vehicle. The selected advertisement content item can include at least one of (i) a visual advertisement content item or (ii) an audio advertisement content item. By way of example an advertisement can be in any form including but not limited to audio, visual, and/or a combination. An advertisement content item can be colorful graphics display, a video, an interactive advertisement, and/or any other advertisement content item form. The data that initiates display of the selected advertisement content item via a display device positioned on an exterior of the vehicle can include, for example, instructions that when processed by the display device cause the display device to output the selected advertisement content item via one or more display devices (e.g., a display screen, speaker, etc.).

In some implementations, as described herein, the timing of the display of the selected advertisement content item can be calibrated based on the specific location of the vehicle. For example, the computing system can determine that the vehicle is within an advertisement target area. The computing system can communicate the data that initiates display of the selected advertisement content item via the display device positioned on the exterior of the vehicle based on the determination that the vehicle is within the advertisement target area, as previously described herein.

At (1065), method 1000C can include communicating data indicative of route information to a computing device associated with the vehicle. For instance, the computing system can communicate data indicative of route information to a computing device associated with the vehicle (e.g., a vehicle device, a user device of an operator, etc.). The route information can include the route for the vehicle. By way of example, route information can include directions from one location to another location, etc. that can be displayed via a vehicle device and/or the operator's user device.

In some implementations, the computing system can communicate a request to a user device associated with an operator of the vehicle. The request can be indicative of a request for permission to display the selected advertisement content item on the display device positioned on the exterior of the vehicle. By way of example the display device can be off (e.g., not currently displaying an advertisement content item, etc.). The display device can be currently displaying a different advertisement content item than the selected advertisement content item. The request for permission can additionally and/or alternatively, include an option to receive user input of acceptance and/or rejection of the request. The request can be accompanied by an incentive for the operator to accept the request (e.g., monetary, rating, etc.).

At (1070), the method 1000C can include determining a different advertisement content item for the vehicle. For instance, the computing system can determine a different advertisement content item than one that is currently being display via the display device positioned on the exterior of the vehicle.

In some implementations, the computing system can determine a different advertisement content item for the vehicle based on a route deviation. For example, the computing system can determine a route deviation by the vehicle that is not performing a vehicle service. The computing system can obtain location data indicative of one or more locations of the vehicle that is not currently associated with a vehicle service instance (e.g., available but "off-service", etc.). The computing system can determine, based on the one or more locations, a route deviation by the vehicle. Based on the route deviation, the computing system can determine an adjustment to the display device positioned on the exterior of the vehicle. As similarly described herein, the adjustment of the display device can include at least one of (i) ceasing display of the selected advertisement content item, (ii) pausing display of the selected advertisement content item, (iii) adjusting one or more attributes of the selected advertisement content item, or (iv) replacing the selected advertisement content item with a difference advertisement content item, as described herein. The computing system can determine the different advertisement content item based on the route deviation, as previously described herein.

Figure 11:
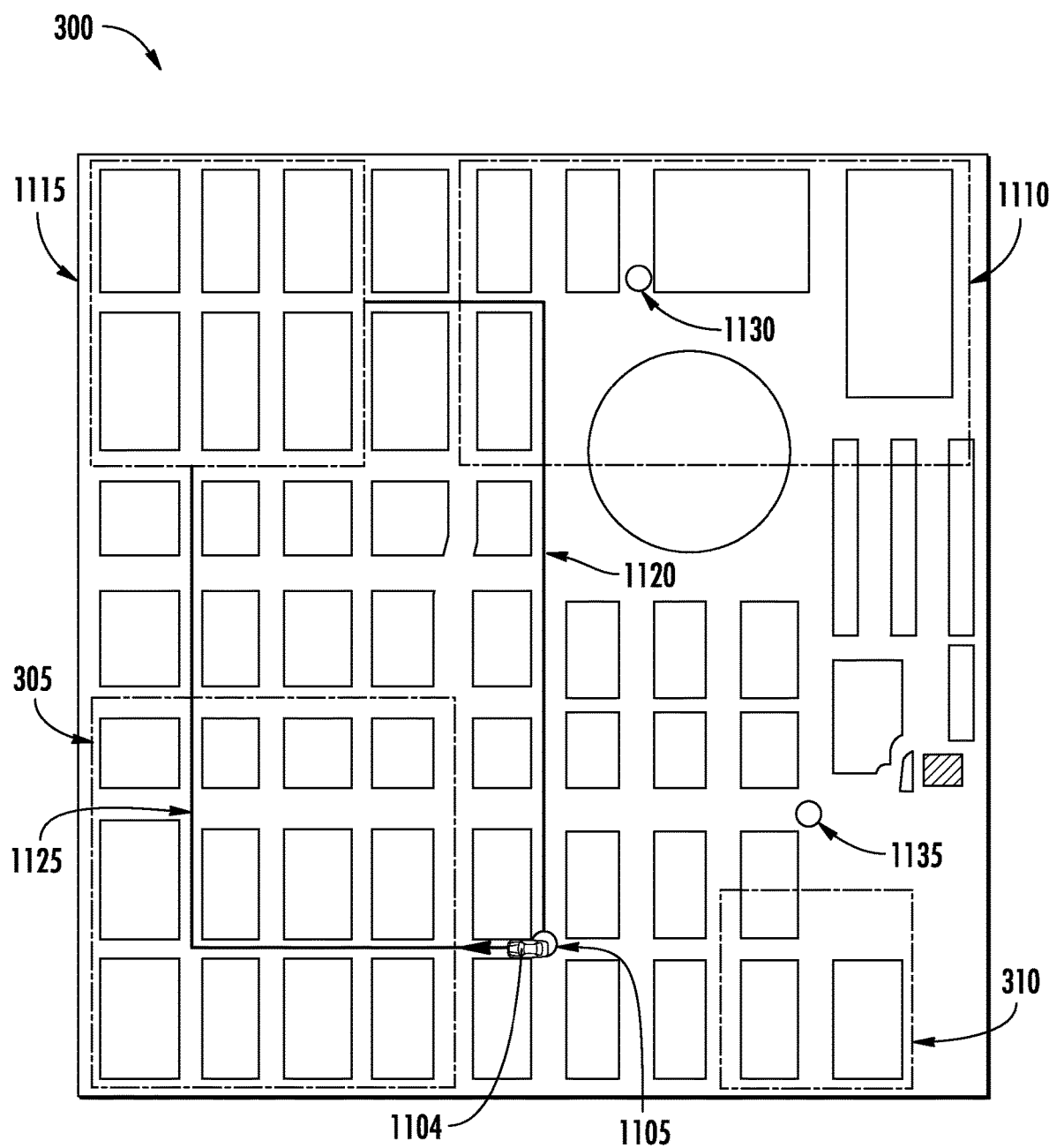
FIG. 11 depicts an example geographic area according to example embodiments of the present disclosure.

Additionally and/or alternatively, the computing system can determine a different advertisement content item for the vehicle based on a vehicle service request. For instance, a user can request a vehicle service. The computing system can obtain data associated with a vehicle service request for a vehicle service. The computing system can select the vehicle (e.g., that is currently off-service and displaying an advertisement content item, etc.) to provide the vehicle service, in a similar manner to that described herein. The computing system can determine a different advertisement content item for the vehicle based on the data associated with the vehicle service request. The different advertisement content item can be determining using the processes and operations described herein such as, for example, those described in methods 900, 1000C, 1000B, etc. For example, the different advertisement content item can be one that would be more advantageous for the vehicle to display while on route to a pick-up location than the currently display advertisement content item. This can be determined by weighing the potential impact (e.g., audience impact, etc.) and/or conversion of the respective advertisement content items, the geographic area in which the vehicle will travel, any potential advertisement target area(s), constraint area(s), etc. The computing system can communicate data that initiates display of the different advertisement content item by the display device positioned on the exterior of the vehicle As discussed in method 1000C, the computing system can determine that a vehicle is online with a service entity and not performing a vehicle service and determine advertisement content item(s) for display via the vehicle. FIG. 11 depicts an overview diagram of geographic area 300 to help illustrate this implementation.

With reference to FIG. 11, a vehicle 1104 that is online with a service entity can be located at location 1105. A computing system (e.g., an operations computing system associated with a service entity, etc.) can obtain data associated with a vehicle 1104 that is online with a service entity associated with providing one or more vehicle services. For example, data associated with a vehicle 1104 can include data indicative of a location, data indicative of the vehicle/operator's availability, data indicative of the vehicle/operator's completion of a vehicle service, etc. The location 1105 can be, for example, a drop-off location associated with a previous vehicle service request.

The computing system can determine, based on the data associated with the vehicle 1104 that the vehicle 1104 is not currently associated with a vehicle service instance for performing one or more of the vehicle services. The computing system can determine a selected advertisement content item for the vehicle 1104 based on the determination that the vehicle 1104 is not currently associated with the vehicle service instance.

In some implementations, the computing system can generate an advertisement trip instance. An advertisement trip instance can be an instance for a vehicle to travel without providing a vehicle service and, instead, provide an advertisement service by displaying an advertisement content item. In some implementations, an operator/vehicle can be matched with the selected route and the selected advertisement content item to create an advertisement trip instance.

In some implementations, the data associated with the vehicle 1104 can include one or more locations of the vehicle 1104 and a heading of the vehicle 1104. The computing system can determine the selected advertisement content item based on at least one of: (i) one or more locations of the vehicle 1104, or (ii) the heading of the vehicle 1104. For example, one or more locations of the vehicle 1104 can include location 1105. The computing system can obtain data associated with the geographic area 300. As described herein, the data associated with the geographic area 300 can be indicative of at least one of: (ii) an advertisement target area 305/310, (i) an advertisement constraint 1110 of the geographic area, or (ii) historic demand data associated with the geographic area. The data can include data described in FIG. 2. The data indicative of historic demand data demand can be historic demand data of an advertisement target area (e.g., advertisement target area 305 and/or advertisement target area 310, etc.).

The computing system can determine a selected route for the vehicle 1104 based on the selected advertisement content item, or vice versa. The computing system can obtain data indicative of a plurality of candidate routes for the vehicle 1104. The computing system can determine a selected route for the vehicle 1104 based on data associated with the geographic area 300. In some implementations, geographic area 300 can include smaller/sub-geographic areas. For example, smaller/sub-geographic areas can include geographic areas associated with the service entity (e.g., area 1115, etc.), advertisement targeting areas (e.g., advertisement target area 305 and/or advertisement target area 310, etc.), and/or advertisement constraint areas (e.g., advertisement constraint area 1110, etc.). The computing system can determine a plurality of candidate routes for the vehicle. The plurality of candidate routes can include a first candidate route 1120 and a second candidate route 1125. The computing system can determine that the first candidate route 1120 includes the vehicle violating an advertisement constraint associated with advertisement constraint area 1110 and that the second candidate route 1125 does not include the vehicle violating the advertisement constraint associated with advertisement constraint area 1110. The computing system can determine the second candidate route 1125 as the selected route based on the determination that it will interact with an advertisement constraint. In addition, or alternatively, second candidate route 1125 can include the vehicle travelling through advertisement target area 305, while the first candidate route 1120 does not. The computing system can determine the second candidate route 1125 as the selected route based on the determination that the vehicle 1104 will travel through the advertisement target area 305 if the vehicle 1104 traverses the second candidate route 1125.

In some implementations, the selected route can be a predetermine route associated with displaying the selected advertisement content item, as described herein. For example, the predetermine route can comprise a loop around city blocks associated with the smaller area 1115 within geographic area 300.

The computing system can communicate data that initiates display of the selected advertisement content item via a display device positioned on an exterior of the vehicle 1104 and data indicative of route information to a computing device associated with the vehicle 1140, as described herein. The route information can include the selected route for the vehicle 1104 to follow while the vehicle is online and not associated with a vehicle service instance or otherwise providing a vehicle service. In some implementations, an advertisement trip instance can be indicative of a selected route associated with a selected advertisement content item and/or the route information associated therewith.

In some implementations, the computing system can coordinate the specific timing for displaying selected advertisement content for the vehicle 1104 that is not being used to perform a vehicle service. For example, the computing system can obtain data indicative of one or more locations of the vehicle 1104. The computing system can determine that the vehicle 1104 is within an advertisement target area 305. The computing system can communicate data that initiates display of the selected advertisement content item via the display device positioned on the exterior of the vehicle 1104 based on the determination that the vehicle 1104 is within the advertisement target area 305. The selected advertisement content item can be based on the advertisement target area 305.

The computing system can adjust the advertisement content item of the vehicle 1104 in response to obtaining a new vehicle service request. For example, the computing system can obtain data associated with a vehicle service request for a vehicle service. The vehicle service request can include, for example, a pick-up location 1130 and a drop-off location 1135. The computing system can select the vehicle 1104 to provide the vehicle service. The computing system can determine a different advertisement content item for display based on the data associated with the vehicle service request. This can include, for example, determining a different advertisement content item based on a route to the pick-up 1130 and/or a route between the pick-up location 1130 and the drop-off location based on the stage of the vehicle service (e.g., on route to the pick-up location 1130, transporting the user/item to the drop-off location 1135, etc.), which can be determined via the software application(s) and/or location data of the various devices described herein. The computing system can communicate data that initiates display of the different advertisement content item by the display device positioned on the exterior of the vehicle 1104.

Figure 12:
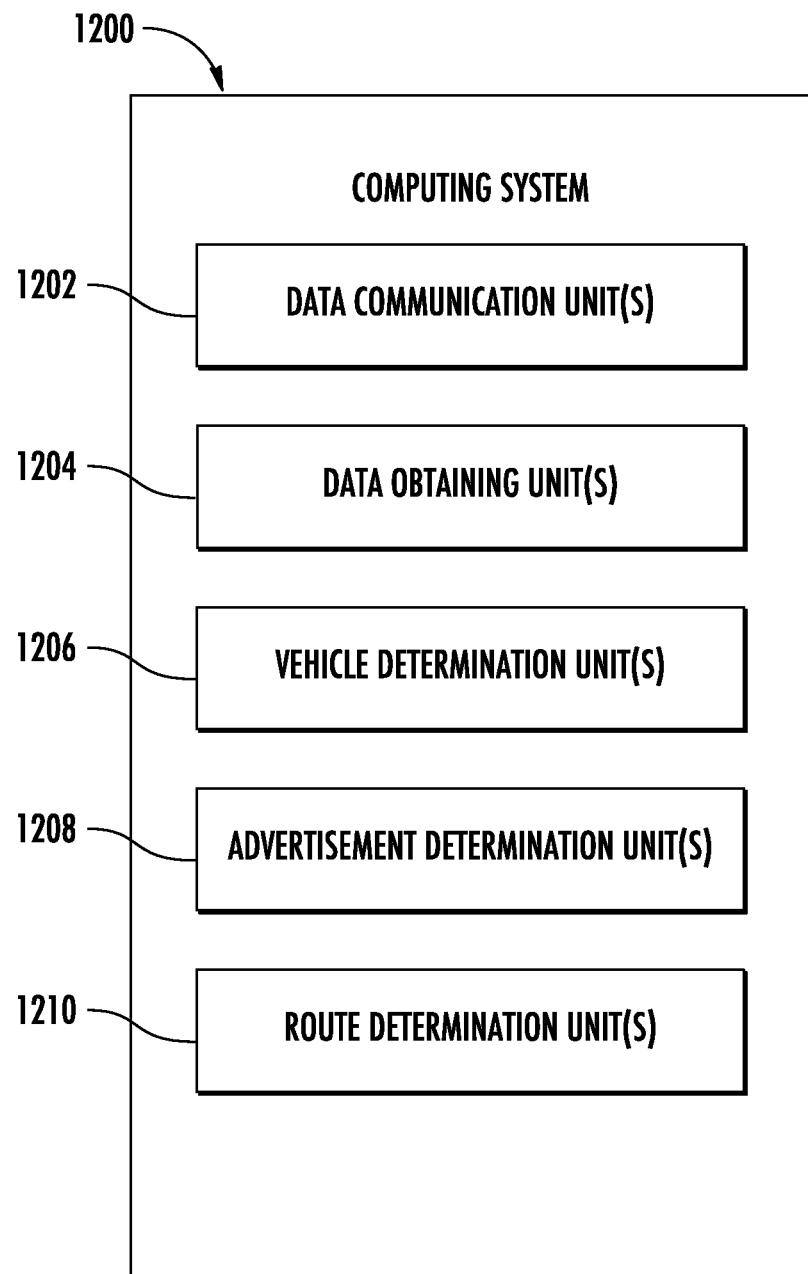
FIG. 12 depicts a block diagram of an example system according to example embodiments of the present disclosure.
Figure 13:
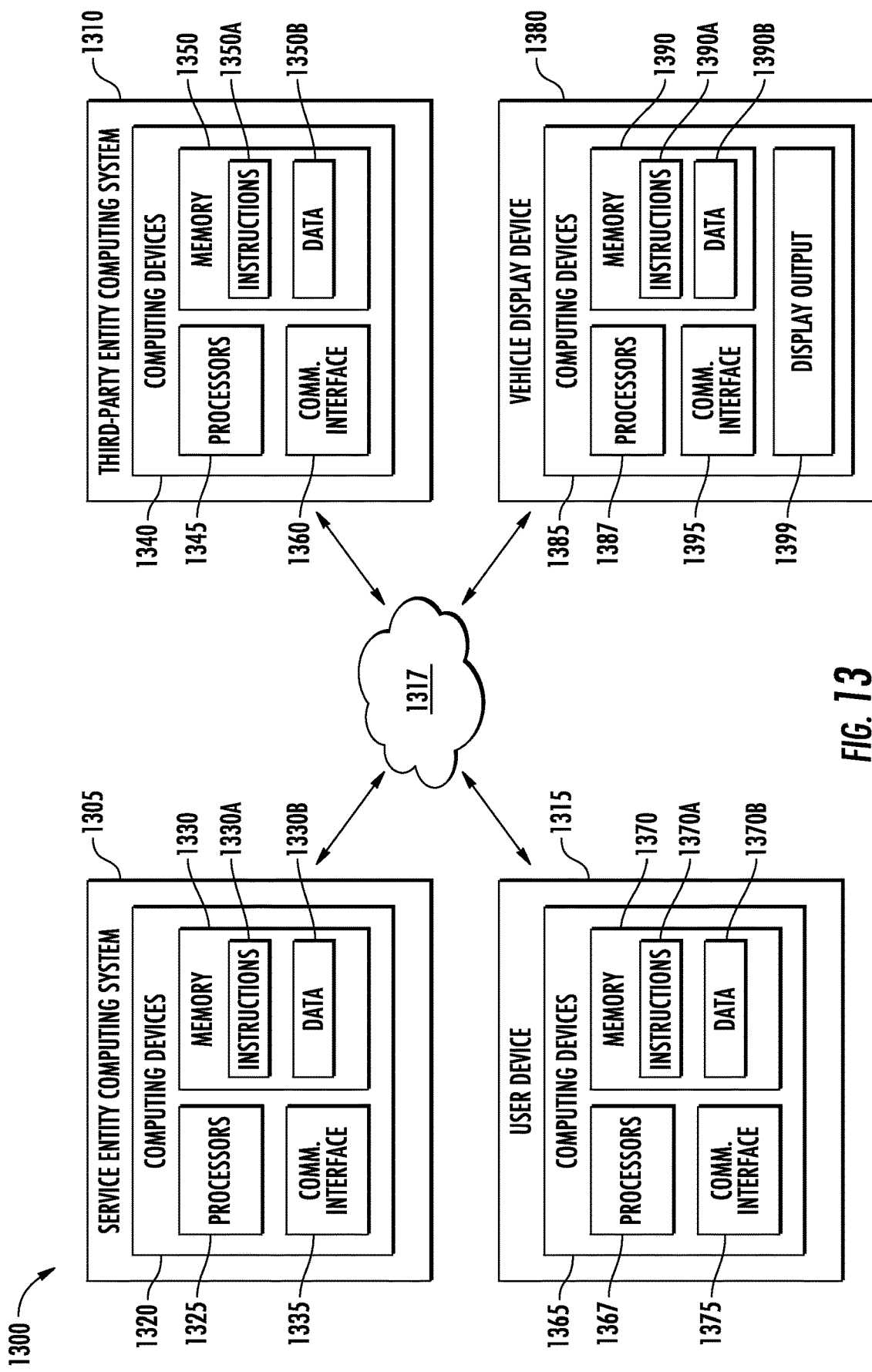
FIG. 13 depicts a block diagram of example systems according to example embodiments of the present disclosure.

Various means can be configured to perform the methods and processes described herein. For example, FIG. 12 depicts an example system 1200 that includes various means according to example embodiments of the present disclosure. The computing system 1200 can be and/or otherwise include, for example, an operations computing system, etc. The computing system 1200 can include data communication unit(s) 1202, data obtaining unit(s) 1204, vehicle determination unit(s) 1206, advertisement determination unit(s) 1208, route determination unit(s) 1210, and/or other means for performing the operations and functions described herein. In some implementations, one or more of the units can be implemented separately. In some implementations, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data communication unit(s) 1202, etc.) can be configured to communicate data indicative of a request for a selected vehicle to perform a vehicle service associated with a vehicle service request. In addition, or alternatively, the means (e.g., data communication unit(s) 1202, etc.) can be configured to communicate data that initiates display of a selected advertisement content item by a display device positioned on an exterior of a selected vehicle. In addition, or alternatively, the means (e.g., data communication unit(s) 1202, etc.) can be configured to communicate data indicative of route information to a computing device associated with the selected vehicle.

In addition, the means (e.g., data obtaining unit(s) 1204, etc.) can be configured to obtain data associated with one or more vehicle service requests. For example, each vehicle service request can be indicative of a pick-up location and/or a destination location associated with a vehicle service request. In addition, in some implementations, the means (e.g., the data obtaining unit(s) 1204, etc.) can obtain data associated with one or more vehicles/operators and map data indicative of one or more geographic areas.

In addition, the means (e.g., vehicle determination unit(s) 1206, etc.) can be configured to determine a selected vehicle for the vehicle service from a plurality of candidate vehicles. For example, the plurality of candidate vehicles can be available to perform a vehicle service associated with a vehicle service request. By way of example, the plurality of candidate vehicles can include human driven vehicles, semi-autonomous vehicles, and fully autonomous vehicles close enough to complete a vehicle service request.

In addition, the means (e.g., advertisement determination unit(s) 1208, etc.) can be configured to determine selected advertisement content item(s) for display from one or more candidate advertisement content items. In addition, or alternatively, the selected advertisement content item(s) for display can be determined based on the selected route.

In addition, the means (e.g., route determination unit(s) 1210, etc.) can be configured to determine one or more candidate routes for one or more candidate vehicles. In addition, or alternatively the means (e.g., route determination unit(s) 1210, etc.) can be configured to determine a selected route for a selected vehicle from an origin location to a pick-up location associated with a vehicle service request. For example, the means (e.g., route determination unit(s) 1210, etc.) can determine the vehicle route based on map data indicative of one or more geographic areas including the origin location and the pick-up location associated with the vehicle service request. The vehicle route, for example, can include driving directions sufficient to direct a vehicle from the origin location to the pick-up location associated with the vehicle service request. In addition, or alternatively the means (e.g., route determination unit(s) 1210, etc.) can be configured to determine a selected route for the selected vehicle from a pick-up location associated with a vehicle service request to a destination location associated with a vehicle service request. In addition, or alternatively, the selected route for the selected vehicle can be determined based on the selected advertisement content item(s). For example, the means (e.g., route determination unit(s) 1210, etc.) can determine the vehicle route based on map data indicative of one or more geographic areas including the pick-up location associated with the vehicle service request and the destination location associated with the vehicle service request. The one or more geographic areas can include areas in which it is desirable to display the selected advertisement content item(s). The vehicle route, for example, can include driving directions sufficient to direct a vehicle from the pick-up location associated with the vehicle service request to the destination location associated with the vehicle service request, while also traversing any target area(s) and/or avoiding constraint area(s), as described herein.

These described functions of the means are provided as examples and are not meant to be limiting. The means can be configured for performing any of the operations and functions described herein.

FIG. 1300 depicts a block diagram of an example system 1300 for implementing systems and methods according to example embodiments of the present disclosure. The example system 1300 illustrated in FIG. 1300 is provided as an example only. The components, systems, connections, and/or other aspects illustrated in FIG. 1300 are optional and are provided as examples of what is possible, but not required, to implement the present disclosure. The example system 1300 can include a service entity computing system 1305 (e.g., that is associated with a service entity, etc.). The example system 1300 can include a third-party entity computing system 1310 (e.g., that is associated with a third-party entity such as an advertisement service/engine, etc.). The example system 1300 can include a user device 1315 (e.g., user device of the user, user device of the operator, user device of the vehicle, etc.). The example system 1300 can include a vehicle display device (e.g., a display device positioned on the exterior of a vehicle, etc.). One or more of the service entity computing system 1305, the third-party entity computing system 1310, the user device 1315, or the vehicle display device can be communicatively coupled to one another over one or more communication network(s) 1317. The networks 1317 can correspond to any of the networks described herein.

The computing device(s) 1320 of the service entity computing system 1305 can include processor(s) 1325 and a memory 1330. The one or more processors 1325 can be any suitable processing device (e.g., a processor core, a microprocessor, an ASIC, a FPGA, a controller, a microcontroller, etc.) and can be one processor or a plurality of processors that are operatively connected. The memory 1330 can include one or more non-transitory computer-readable storage media, such as RAM, ROM, EEPROM, EPROM, one or more memory devices, flash memory devices, data registrar, etc., and combinations thereof.

The memory 1330 can store information that can be accessed by the one or more processors 1325. For example, the memory 1330 (e.g., one or more non-transitory computer-readable storage mediums, memory devices, etc.) can include computer-readable instructions 1330A that can be executed by the one or more processors 1325. The instructions 1330A can be software written in any suitable programming language or can be implemented in hardware. Additionally, or alternatively, the instructions 1330A can be executed in logically and/or virtually separate threads on processor(s) 1325.

For example, the memory 1330 can store instructions 1330A that when executed by the one or more processors 1325 cause the one or more processors 1325 (e.g., of the service entity computing system 1305, etc.) to perform operations such as any of the operations and functions of the computing system(s) (e.g., operations computing system, etc.) described herein (or for which the system(s) are configured), one or more of the operations and functions for communicating between the computing systems, one or more portions/operations of method 900, 1000A, 1000B, and/or 1000C, and/or one or more of the other operations and functions of the computing systems described herein.

The memory 1330 can store data 1330B that can be obtained (e.g., acquired, received, retrieved, accessed, created, stored, etc.). The data 1330B can include, for example, any of the data/information described herein. In some implementations, the computing device(s) 1320 can obtain data from one or more memories that are remote from the service entity computing system 1305.

The computing device(s) 1320 can also include a communication interface 1335 used to communicate with one or more other system(s) remote from the service entity computing system 1305, such as third-party entity computing system 1310, user device 1315, and/or vehicle display device 1380. The communication interface 1335 can include any circuits, components, software, etc. for communicating via one or more networks (e.g., network(s) 1317, etc.). The communication interface 1335 can include, for example, one or more of a communications controller, receiver, transceiver, transmitter, port, conductors, software and/or hardware for communicating data.

The third-party entity computing system 1310 can include one or more computing device(s) 1340 that are remote from the service entity computing system 1305, the user device 1315, and the vehicle display device 1380. The computing device(s) 1340 can include one or more processors 1345 and a memory 1350. The one or more processors 1345 can be any suitable processing device (e.g., a processor core, a microprocessor, an ASIC, a FPGA, a controller, a microcontroller, etc.) and can be one processor or a plurality of processors that are operatively connected. The memory 1350 can include one or more tangible, non-transitory computer-readable storage media, such as RAM, ROM, EEPROM, EPROM, one or more memory devices, flash memory devices, data registrar, etc., and combinations thereof.

The memory 1350 can store information that can be accessed by the one or more processors 1345. For example, the memory 1350 (e.g., one or more tangible, non-transitory computer-readable storage media, one or more memory devices, etc.) can include computer-readable instructions 1350A that can be executed by the one or more processors 1345. The instructions 1350A can be software written in any suitable programming language or can be implemented in hardware. Additionally, or alternatively, the instructions 1350A can be executed in logically and/or virtually separate threads on processor(s) 1345.

For example, the memory 1350 can store instructions 1350A that when executed by the one or more processors 1345 cause the one or more processors 1345 to perform operations such as any of the operations and functions of the computing system(s) (e.g., advertisement server, etc.) described herein (or for which the system(s) are configured), one or more of the operations and functions for communicating between computing systems, one or more portions/operations of method 900, 1000A, 1000B, and/or 1000C, and/or one or more of the other operations and functions of the computing systems described herein. The memory 1350 can store data 1350B that can be obtained. The data 1350B can include, for example, any of the data/information described herein.

The computing device(s) 1340 can also include a communication interface 1360 used to communicate with one or more system(s) that are remote from the system 1310. The communication interface 1360 can include any circuits, components, software, etc. for communicating via one or more networks (e.g., network(s) 1317, etc.). The communication interface 1360 can include, for example, one or more of a communications controller, receiver, transceiver, transmitter, port, conductors, software and/or hardware for communicating data.

The user device 1315 can include one or more computing device(s) 1365 that are remote from the service entity computing system 1305, the third-party entity computing system 1310, and the vehicle display device 1380. The computing device(s) 1365 can include one or more processors 1367 and a memory 1370. The one or more processors 1370 can be any suitable processing device (e.g., a processor core, a microprocessor, an ASIC, a FPGA, a controller, a microcontroller, etc.) and can be one processor or a plurality of processors that are operatively connected. The memory 1370 can include one or more tangible, non-transitory computer-readable storage media, such as RAM, ROM, EEPROM, EPROM, one or more memory devices, flash memory devices, data registrar, etc., and combinations thereof.

The memory 1370 can store information that can be accessed by the one or more processors 1367. For example, the memory 1370 (e.g., one or more tangible, non-transitory computer-readable storage media, one or more memory devices, etc.) can include computer-readable instructions 1370A that can be executed by the one or more processors 1367. The instructions 1370A can be software written in any suitable programming language or can be implemented in hardware. Additionally, or alternatively, the instructions 1370A can be executed in logically and/or virtually separate threads on processor(s) 1367.

For example, the memory 1370 can store instructions 1370A that when executed by the one or more processors 1367 cause the one or more processors 1367 to perform operations such as any of the operations and functions of the computing system(s) (e.g., user devices, etc.) described herein (or for which the user device(s) are configured), one or more of the operations and functions for communicating between systems, one or more portions/operations of method 900, 1000A, 1000B, and/or 1000C, and/or one or more of the other operations and functions of the computing systems described herein. The memory 1370 can store data 1370B that can be obtained. The data 1370B can include, for example, any of the data/information described herein.

The computing device(s) 1365 can also include a communication interface 1375 used to communicate computing device/system that is remote from the user device 1315, such as third-party entity computing system 1310, service entity computing system 1305, or vehicle display device 1380. The communication interface 1375 can include any circuits, components, software, etc. for communicating via one or more networks (e.g., network(s) 1317, etc.). The communication interface 1375 can include, for example, one or more of a communications controller, receiver, transceiver, transmitter, port, conductors, software and/or hardware for communicating data.

The computing device(s) 1385 of the vehicle display device 1380 can include processor(s) 1387 and a memory 1390. The one or more processors 1387 can be any suitable processing device (e.g., a processor core, a microprocessor, an ASIC, a FPGA, a controller, a microcontroller, etc.) and can be one processor or a plurality of processors that are operatively connected. The memory 1390 can include one or more non-transitory computer-readable storage media, such as RAM, ROM, EEPROM, EPROM, one or more memory devices, flash memory devices, data registrar, etc., and combinations thereof.

The memory 1390 can store information that can be accessed by the one or more processors 1387. For example, the memory 1390 (e.g., one or more non-transitory computer-readable storage mediums, memory devices, etc.) can include computer-readable instructions 1390A that can be executed by the one or more processors 1387. The instructions 1390A can be software written in any suitable programming language or can be implemented in hardware. Additionally, or alternatively, the instructions 1390A can be executed in logically and/or virtually separate threads on processor(s) 1387.

For example, the memory 1390 can store instructions 1390A that when executed by the one or more processors 1387 cause the one or more processors 1387 (e.g., of the vehicle display device 1380, etc.) to perform operations such as any of the operations and functions of the display device (s) described herein (or for which such devices are configured), one or more of the operations and functions for communicating between the computing systems/devices, one or more portions/operations of method 900, 1000A, 1000B, and/or 1000C, and/or one or more of the other operations and functions of the computing systems described herein.

The memory 1390 can store data 1390B that can be obtained (e.g., acquired, received, retrieved, accessed, created, stored, etc.). The data 1390B can include, for example, any of the data/information described herein. In some implementations, the computing device(s) 1385 can obtain data from one or more memories that are remote from the vehicle display device 1380.

The computing device(s) 1385 can also include a communication interface 1395 used to communicate with one or more other system(s) remote from the vehicle display device 1380, such as third-party entity computing system 1310, user device 1315, and/or service entity computing system 1305. The communication interface 1395 can include any circuits, components, software, etc. for communicating via one or more networks (e.g., network(s) 1317, etc.). The communication interface 1395 can include, for example, one or more of a communications controller, receiver, transceiver, transmitter, port, conductors, software and/or hardware for communicating data.

The vehicle display device can include a display output 1399. The display output 1399 can be any type of display including, for example, a cartop display device, liquid crystal display (LCD), liquid emitting diode display (LED), organic light emitting diode (OLED), plasma monitor, cathode ray tube (CRT), display screen, monitor, television, or any other suitable display device.

The network(s) 1317 can be any type of network or combination of networks that allows for communication between devices. In some implementations, the network(s) 1317 can include one or more of a local area network, wide area network, the Internet, secure network, cellular network, mesh network, peer-to-peer communication link and/or some combination thereof and can include any number of wired or wireless links. Communication over the network(s) 1317 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral for example illustrated purposes and is not meant to be limiting.

Although claims included herein may be shown to be dependent on other certain claims, any of the claims can depend on one or more other claims, including any preceding claims.

What is claimed is:

1. A computing system comprising: one or more processors; and one or more tangible, non-transitory, computer readable media that store instructions that are executable by the one or more processors to cause the computing system to perform operations, the operations comprising:

obtaining data associated with a vehicle service request, wherein the data associated with the vehicle service request is indicative of a pick-up location and a destination location associated with the vehicle service request;

determining, from among a plurality of candidate vehicles, a selected vehicle for the vehicle service request based on the data indicative of the vehicle service request, one or more candidate advertisement content items, and one or more candidate routes for one or more of the plurality of candidate vehicles by:
analyzing the one or more candidate advertisement content items and the one or more candidate routes for the one or more of the plurality of candidate vehicles based on a determination of each respective candidate advertisement content item's ability to match with each respective candidate route;

generating a plurality of vehicle-route-ad sets, each respective vehicle-route-ad set comprising a candidate route, a candidate vehicle, and a candidate advertisement content item;

determining a value for each respective vehicle-route-ad set of the plurality of vehicle-route-ad sets based at least in part on at least one of an advertisement target area, an advertisement constraint area, or data indicative of one or more user preferences;

ranking each vehicle-route-ad set of the plurality of vehicle-route-ad sets;

selecting a highest ranked vehicle-route-ad set, wherein the highest ranked vehicle-route-ad set comprises a selected advertisement content item;

communicating data comprising executable instructions that, when executed by one or more processors of a display device, cause the display device to initiate display of the selected advertisement content item by a display device positioned on an exterior of the selected vehicle;

communicating data indicative of route information to a computing device associated with the selected vehicle, wherein the route information comprises a selected route to the pick-up location;
monitoring a current location of the selected vehicle obtaining location data from the location determining hardware of the selected vehicle and comparing the obtained location data to an expected location of the selected vehicle; and communicating data comprising executable instructions, that when executed by the one or more processors of the display device, cause the display device to update the display based on the current location of the selected vehicle.

2. The computing system of claim 1, wherein the operations further comprise:
determining the one or more candidate routes;
determining the one or more candidate advertisement content items based on the one or more candidate routes; and
determining the selected route and the selected advertisement content item based on the one or more candidate routes and the one or more candidate advertisement content items.

3. The computing system of claim 1, wherein the operations further comprise:
determining the one or more candidate advertisement content items;
determining the one or more or more candidate routes based on the one or more candidate advertisement content items; and
determining the selected advertisement content item and the selected route based on the one or more candidate routes and the one or more candidate advertisement content items.

4. The computing system of claim 3, wherein determining the one or more candidate advertisement content items comprises:
communicating a request for the one or more candidate advertisement content items to a third-party computing system associated with an advertisement content management service provider; and
obtaining the one or more candidate advertisement content items from the third-party computing system.

5. The computing system of claim 1, wherein communicating the data that initiates the display of the selected advertisement content item comprises:
determining that the selected vehicle is within a predetermined threshold of the pick-up location associated with the vehicle service request; and
communicating the data that initiates the display of the selected advertisement content item based on determining that the selected vehicle is within the predetermined threshold of the pick-up location.

6. The computing system of claim 1, wherein the operations further comprise:
determining, from among the one or more candidate routes, the selected route based on at least one of: (i) a distance threshold; (ii) a time threshold; or (iii) a user experience measure.

7. The computing system of claim 1, wherein the operations further comprise:
determining, from among the one or more candidate routes and the one or more candidate advertisement content items, the selected route and the selected advertisement content item based on an advertisement target area, wherein the advertisement target area comprises a geographic area through which the selected route travels.

8. The computing system of claim 7, wherein the advertisement target area is based on at least one of: (i) a targeting zone, (ii) a predefined geographic radius, (iii) a geofence, (iv) one or more regional characteristics, or (v) one or more attributes of one or more individuals associated with the geographic area.

9. The computing system of claim 1, wherein determining the selected vehicle is further based on at least one of: (i) an advertisement constraint, (ii) a user preference, (iii) a driver preference, (iv) map data, (v) vehicle characteristic data, or (vi) a subject matter of the selected advertisement content item.

10. The computing system of claim 1, wherein the route information further comprises a selected route from the pick-up location to the destination location.

11. The computing system of claim 1, wherein the operations further comprising:
obtaining location data indicative of one or more locations of the selected vehicle;
determining, based on the one or more locations, a route deviation by the selected vehicle; and
determining, based on the route deviation, an adjustment to the display device positioned on the exterior of the selected vehicle.

12. The computing system of claim 11, wherein the adjustment to the display device comprises at least one of: (i) ceasing display of the selected advertisement content item, (ii) pausing display of the selected advertisement content item, (iii) adjusting one or more attributes of the selected advertisement content item, or (iv) replacing the selected advertisement content item with a different advertisement content item.

13. The computing system of claim 12, wherein the operations further comprise:
determining the different advertisement content item based on the route deviation.

14. The computing system of claim 11, wherein the route deviation occurs as the selected vehicle travels between an origin location of the selected vehicle and the pick-up location associated with the vehicle service request.

15. The computing system of claim 11, wherein the route deviation occurs as the selected vehicle travels between the pick-up location and the destination location associated with the vehicle service request.

16. The computing system of claim 1, wherein the vehicle service request comprises at least one of: (i) a request for a user transportation service, (ii) a request for a delivery service, or (iii) a request for a courier service.

17. A computer-implemented method comprising: obtaining data associated with a vehicle service request, wherein the data associated with the vehicle service request 1 s indicative of a pick-up location and a destination location associated with the vehicle service request; determining, from among a plurality of candidate vehicles, a selected vehicle for the vehicle service request based on the data indicative of the vehicle service request, one or more candidate advertisement content items, and one or more candidate routes for one or more of the plurality of candidate vehicles by: analyzing the one or more candidate advertisement content items and the one or more candidate routes for the one or more of the plurality of candidate vehicles based on a determination of each respective candidate advertisement content item's ability to match with each respective candidate route; generating a plurality of vehicle-route-ad sets, each respective vehicle-route-ad set comprising a candidate route, a candidate vehicle, and a candidate advertisement content item; determining a value for each respective vehicle-route-ad set of the plurality of vehicle-route-ad sets based at least in part on at least one of an advertisement target area, an advertisement constraint area, or data indicative of one or more user preferences; ranking each vehicle-route-ad set of the plurality of vehicle-route-ad sets; selecting a highest ranked vehicle-route-ad set, wherein the highest ranked vehicle-route-ad set comprises a selected advertisement content item; communicating data comprising executable instructions that, when executed by one or more processors of a display device, cause the display device to initiate display of the selected advertisement content item by a display device positioned on an exterior of the selected vehicle;

communicating data indicative of route information to a computing device associated with the selected vehicle, wherein the route information comprises a selected route to the pick-up location;

monitoring a current location of the selected vehicle by obtaining location data from the location determining hardware of the selected vehicle and comparing the obtained location data to an expected location of the selected vehicle; and communicating data comprising executable instructions, that when executed by the one or more processors of the display device, cause the display device to update the display based on the current location of the selected vehicle.

18. The computer-implemented method of claim 17, further comprising:

determining the selected vehicle has arrived at the destination location;

obtaining data indicative of completion of the vehicle service request;

determining the vehicle service request has been completed by the selected vehicle; and determining a new selected advertisement content item for the display device positioned on the exterior of the selected vehicle to display after completion of the vehicle service request.

19. The computer-implemented method of claim 18, wherein determining the new selected advertisement content item comprises:

determining the new selected advertisement content item based on an advertisement target area to which the selected vehicle is predicted to travel.

20. One or more non-transitory computer readable media storing instructions that are executable by one or more processors to perform operations comprising:

obtaining data associated with a vehicle service request, wherein the data associated with the vehicle service request 1 s indicative of a pick-up location and a destination location associated with the vehicle service request;

determining, from among a plurality of candidate vehicles, a selected vehicle for the vehicle service request based on the data indicative of the vehicle service request, one or more candidate advertisement content items, and one or more candidate routes for one or more of the plurality of candidate vehicles by: analyzing the one or more candidate advertisement content items and the one or more candidate routes for the one or more of the plurality of candidate vehicles based on a determination of each respective candidate advertisement content item's ability to match with each respective candidate route; generating a plurality of vehicle-route-ad sets, each respective vehicle-route-ad set comprising a candidate route, a candidate vehicle, and a candidate advertisement content item; determining a value for each respective vehicle-route-ad set of the plurality of vehicle-route-ad sets based at least in part on at least one of an advertisement target area, an advertisement constraint area, or data indicative of one or more user preferences; ranking each vehicle-route-ad set of the plurality of vehicle-route-ad sets; selecting a highest ranked vehicle-route-ad set, wherein the highest ranked vehicle-route-ad set comprises a selected advertisement content item; communicating data comprising executable instructions that, when executed by one or more processors of a display device, cause the display device to initiate display of the selected advertisement content item by a display device positioned on an exterior of the selected vehicle; communicating data indicative of route information to a computing device associated with the selected vehicle, wherein the route information comprises a selected route to the pick-up location; monitoring a current location of the selected vehicle y obtaining location data from the location determining hardware of the selected vehicle and comparing the obtained location data to an expected location of the selected vehicle; and communicating data comprising executable instructions, that when executed by the one or more processors of the display device, cause the display device to update the display based on the current location of the selected vehicle.

* * * * *